(12) United States Patent
Zetterberg et al.

(10) Patent No.: US 8,238,920 B2
(45) Date of Patent: Aug. 7, 2012

(54) METHOD AND APPARATUS FOR TRIGGERING MEASUREMENTS OF OTHER RADIO ACCESS TECHNOLOGIES (RATS)

(75) Inventors: Kristina Zetterberg, Linköping (SE); Jose Alonso-Rubio, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 12/690,625

(22) Filed: Jan. 20, 2010

(65) Prior Publication Data
US 2011/0176430 A1 Jul. 21, 2011

(51) Int. Cl.
H04W 36/30 (2009.01)
H04W 36/00 (2009.01)
(52) U.S. Cl. ........................................................ 455/439
(58) Field of Classification Search .................. 455/436, 455/439
See application file for complete search history.

(56) References Cited

U.S. PATENT DOCUMENTS

| | | | |
|---|---|---|---|
| 6,507,740 B2* | 1/2003 | Shi | 455/437 |
| 2003/0119508 A1* | 6/2003 | Gwon et al. | 455/436 |
| 2008/0081624 A1 | 4/2008 | Reial et al. | |
| 2009/0067386 A1 | 3/2009 | Kitazoe | |
| 2009/0247150 A1 | 10/2009 | Fischer et al. | |
| 2009/0286542 A1 | 11/2009 | Roberts et al. | |
| 2010/0056157 A1* | 3/2010 | Verona et al. | 455/438 |

FOREIGN PATENT DOCUMENTS

| | | |
|---|---|---|
| WO | 2008-037552 | 4/2008 |
| WO | 2008-157573 | 12/2008 |
| WO | 2009-021009 | 2/2009 |
| WO | 2010-025022 | 3/2010 |

OTHER PUBLICATIONS

International Search Report issued for PCT Application No. PCT/SE2011/050044, dated May 2, 2011.
Written Opinion of the International Searching Authority issued for PCT Application No. PCT/SE2011/050044, dated May 2, 2011.

* cited by examiner

*Primary Examiner* — Melvin Marcelo
(74) *Attorney, Agent, or Firm* — Nixon & Vanderhye P.C.

(57) ABSTRACT

Automatic setting and/or adjusting of the threshold(s) for triggering measurements of signal strength/quality of other RATs that are needed for IRAT mobility is described. The setting and/or adjusting of the threshold(s) triggering IRAT measurements is automatically optimized and preferably performed for each BS. Initially, constraints on the optimization of the IRAT measurement triggering threshold(s) are set, and a start value for the optimization of the IRAT measurement triggering threshold(s) is provided or determined. Input information needed for the optimization of the IRAT measurement triggering threshold(s) are then collected, and new IRAT measurement triggering threshold(s) are determined and set or existing IRAT measurement triggering threshold(s) are adjusted if appropriate. Operator expenses for adjusting the IRAT measurement triggering threshold(s) to appropriate values are thereby reduced as compared to manual setting, and the efficiency loss caused by non-optimized IRAT measurement triggering threshold(s) is reduced or minimized.

32 Claims, 16 Drawing Sheets

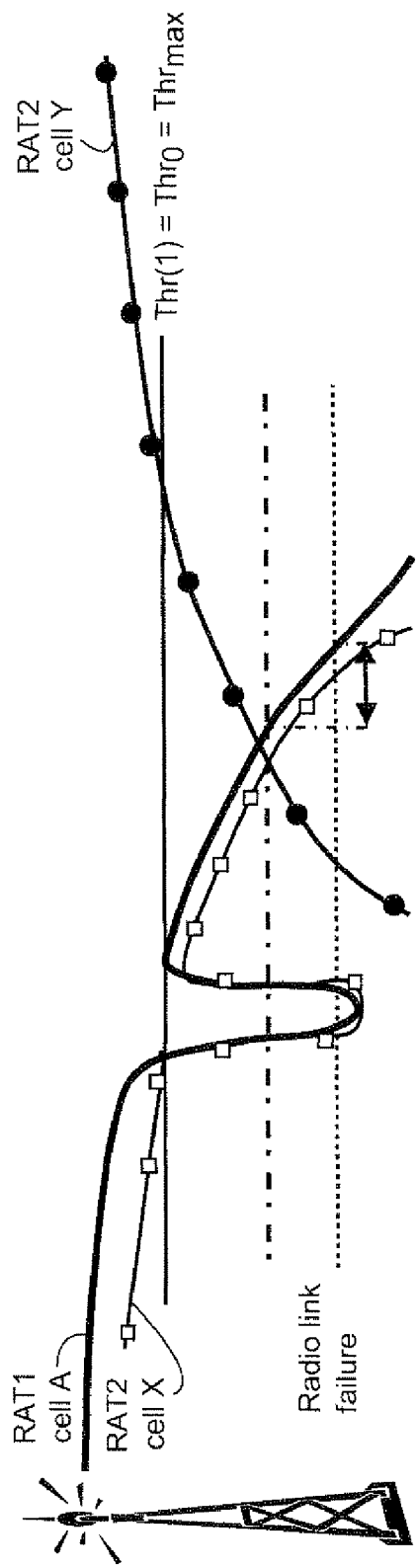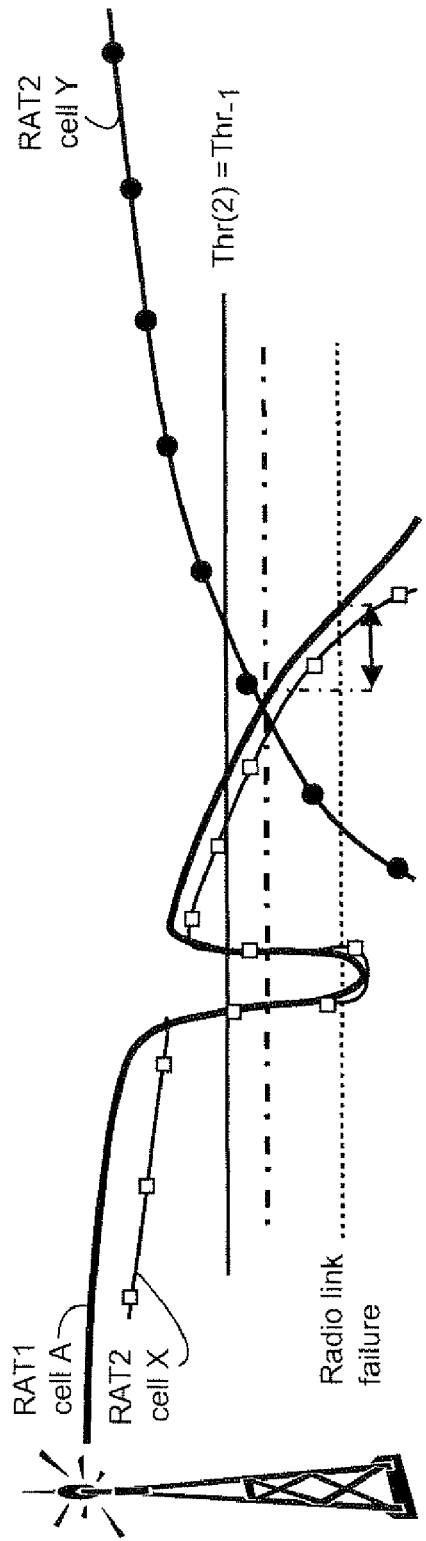

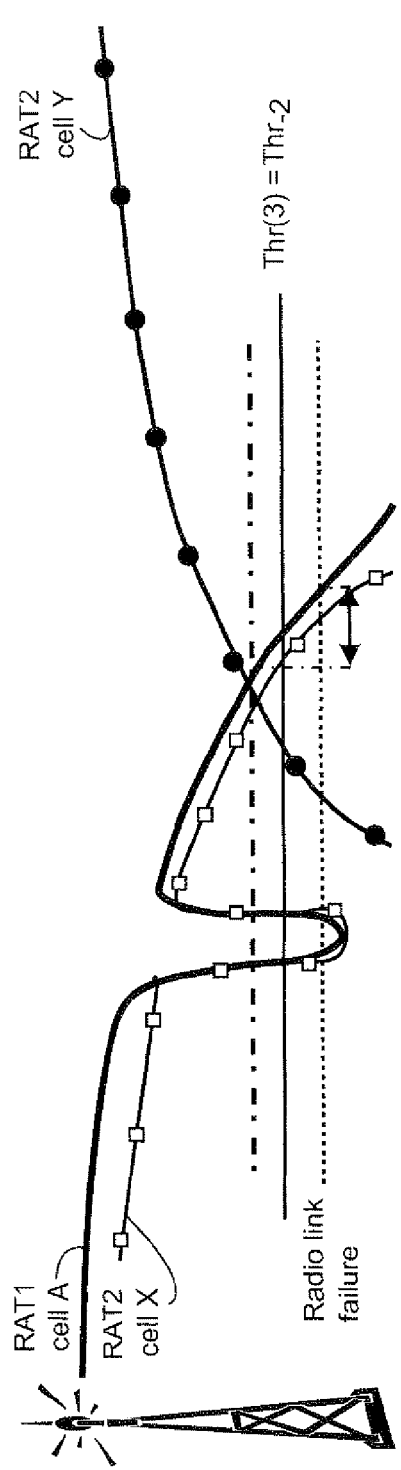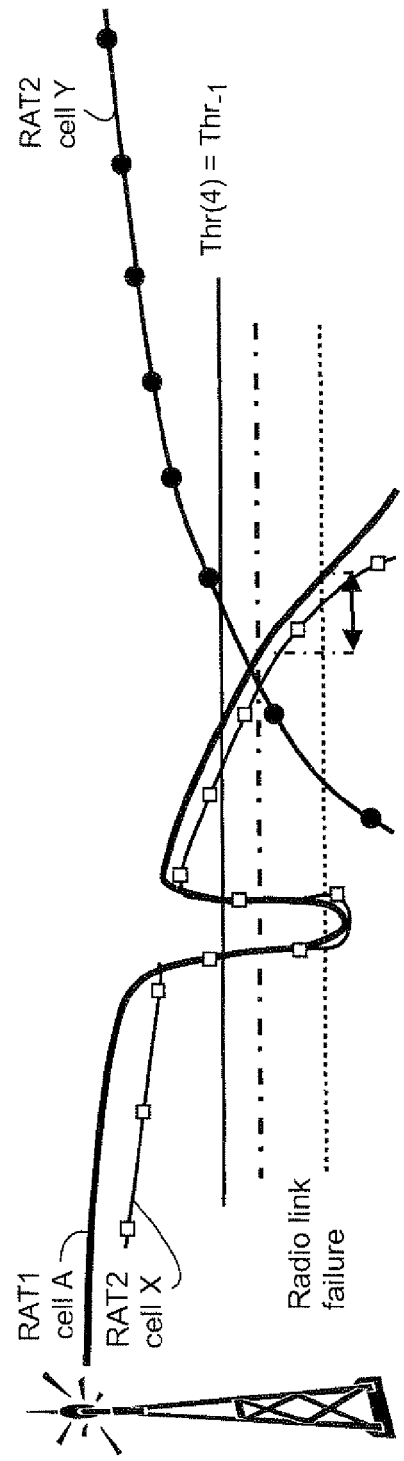

METHOD AND APPARATUS FOR TRIGGERING MEASUREMENTS OF OTHER RADIO ACCESS TECHNOLOGIES (RATS)

TECHNICAL FIELD

The technical field relates to measurement triggering for use in radio communications.

BACKGROUND

In a typical radio communications system, radio communications terminals, referred to as radio terminals or user equipment terminals UEs, communicate via an access network with other networks like the Internet. For example, a radio access network (RAN) in a cellular communications system covers a geographical area which is divided into coverage cells, with each cell being served by a base station, e.g., a radio base station (RBS), which in some networks is also called a "Node B" or an evolved Node B "eNodeB." Each base station typically serves several cells. One common deployment is 3-cell base station installations, where a base station serves three cells. Other wireless systems, like WiFi systems, employ access points (APs) to provide network access to wireless terminals. For simplicity, wireless access points, radio base stations, and the like are referred to generally as base stations and user equipment terminals, access terminals, and the like are referred to generally as radio terminals.

A base station communicates over the air interface operating on radio frequencies with the radio terminals within range of the base station. The radio signals may either be dedicated signals to and from specific radio terminals, multicast signals intended for a subset of the radio terminals in a cell or coverage area, or broadcast signals from the base station to all radio terminals in a cell or coverage area. For simplicity, a cell is understood to include a radio coverage area or the like. A base station broadcasts information to all the radio terminals in a cell using the broadcast channel of the serving cell. Each cell is identified by a cell identifier within the local radio area, which is broadcast in the cell.

As the mobile station moves around in the region covered by the network, at each time moment, it is connected via a radio link to the cell that can provide the connection with "least cost," where the cost is often related to the signal power needed to transmit over the radio link. Often, but not necessarily, the serving cell is the cell physically closest to the mobile station. The mobile station makes measurements based on signals it receives from the serving and neighboring base stations. The mobile station reports the measurements to its serving base station, and based on those measurements, the network may perform a handover (HO) procedure to transfer the mobile station's connection from one cell to another. In some systems, the mobile station can maintain a connection simultaneously over several cells, using several radio links in parallel.

The work of specifying the Evolved Universal Terrestrial Radio Access Network (E-UTRAN) consisting of the Long Term Evolution (LTE) and System Architecture Evolution (SAE) concepts is currently ongoing within the 3$^{rd}$ Generation Partnership Project (3GPP). To provide seamless mobility, e.g., in areas where E-UTRAN does not provide good coverage/quality, it is necessary to be able to handover (HO) mobile stations (MSs) in E-UTRAN to an alternative Radio Access Technology (RAT) such as GSM EDGE Radio Access Network (GERAN) or Universal Terrestrial Radio Access Network (UTRAN) with better coverage. It is also desired for a mobile station (MS) or UE served by 2G (e.g. GERAN) or 3G (e.g. UTRAN), to switch to E-UTRAN once the MS/UE is within the coverage of E-UTRAN. The latter is desired since higher data rates are offered by E-UTRAN enabling services with greater bandwidth requirements. Handover between two different RATs is referred to as an inter-RAT (IRAT) handover (HO).

An important focus area in E-UTRAN standardization work is to ensure that the new network is simple to deploy and cost efficient to operate. The vision is to move the new system towards self-optimizing and self-configuring in many aspects. One aspect that would benefit from self-optimization and self-configuration is the triggering of the measurements of other RATs that are needed for IRAT mobility, e.g., when handing over a mobile station from E-UTRAN to UTRAN. If the IRAT measurement triggering is too early, this could lead to early IRAT HOs that may result in lower data rates for the users and inefficiency. If the IRAT measurement triggering is too late, this leads to a too short measurement time for the mobile stations before the signal strength or quality of the serving cell is too low and may result in Radio Link Failures (RLFs). It would be desirable to provide automatic adjustment of the IRAT measurement triggering thresholds.

SUMMARY

Computer-implemented automatic setting and/or adjusting of the threshold(s) for triggering measurements of signal strength/quality of other RATs that are needed for IRAT mobility is described. An example threshold is a Reference Signal Received Power (RSRP) threshold for IRAT measurements in E-UTRAN. The setting and/or adjusting of the threshold(s) triggering IRAT measurements is automatically optimized and preferably performed for each BS. Initially, constraints on the optimization of the IRAT measurement triggering threshold(s) are set, and a start value for the optimization of the IRAT measurement triggering threshold(s) is provided or determined. Input information needed for the optimization of the IRAT measurement triggering threshold(s) are then collected, and new IRAT measurement triggering threshold(s) are determined and set or existing IRAT measurement triggering threshold(s) are adjusted if appropriate. Operator expenses for adjusting the IRAT measurement triggering threshold(s) to appropriate values are thereby reduced as compared to manual setting, and the efficiency loss caused by non-optimized IRAT measurement triggering threshold(s) is reduced or minimized.

In one non-limiting example embodiment, a computer obtains information associated with a serving base station in the current RAT network serving a mobile radio and with one or more base stations in the different RAT network. The information includes one or more parameters indicating an effect and efficiency of a current inter-RAT measurement triggering threshold. The computer determines a new measurement triggering threshold value or adjusts an existing measurement triggering threshold value used by the current RAT network for initiating inter-RAT handover measurements by the mobile radio based on the obtained information. (There can be multiple triggering thresholds.) An indication of the new or adjusted measurement triggering threshold value is provided so that the new or adjusted measurement triggering threshold value can be used by the mobile radio.

Obtaining the information and determining the new measurement triggering threshold value or adjusting the existing triggering threshold measurement value may be repeated in an optimization process until a desired measurement triggering threshold value is identified. Earlier-obtained information may be used along with currently-obtained information to determine a new measurement triggering threshold value or adjust an existing measurement triggering threshold value. Each repetition results in a determination that the current inter-RAT measurement triggering threshold should be decreased, increased, or left unchanged.

The computer may set one or more constraints on the new or adapted measurement triggering threshold value including a maximum measurement triggering threshold value and a minimum measurement triggering threshold value. For example, the maximum measurement triggering threshold value may be set at a level where the current RAT signal strength and/or quality meets a predetermined requirement and where there is time for a moving mobile radio to identify an inter-RAT candidate base station and perform an inter-RAT handover to the identified inter-RAT candidate base station. The minimum measurement triggering threshold value may be set, for example, at a level such the inter-RAT measurement is triggered before a signal quality of the serving base station reaches a level that cause radio link failure. In addition, an initial measurement triggering threshold value can be set.

The one or more parameters includes in an example, non-limiting embodiment a radio link failure (RLF) parameter associated with the number of radio link failures during a given time or an inverted mean time elapsed between radio link failures during a given time. The radio link failure (RLF) parameter may be based on a current RLF parameter and a previous RLF parameter determined for an earlier repetition.

Other example parameters that may be used alone or in combination include an inter-RAT handover measurement efficiency (IME) parameter that is based on a number of triggered inter-RAT measurements that actually result in a found inter-RAT handover candidate base station, a RAT signal drop ratio which indicates how large a portion of radio link failures associated with the serving base station occurred when a signal quality drop also occurred in other RAT networks, or an early inter-RAT handover ratio which indicates how large a portion of mobile radios served by the serving base station before an inter-RAT handover for which an inter-RAT handover was triggered earlier than necessary.

BRIEF DESCRIPTION OF THE DRAWINGS

FIGS. 13-16 are illustrations showing a RAT1 and RAT2 signal strength/quality and threshold setting example 1 with different optimization loops 1-4;

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). For simplicity, the term mobile station (MS) is used to cover any type of mobile radio device.

Many radio access networks use mobile-assisted handover where each MS periodically monitors the signal strength and/or quality of the serving base station (BS) as well as the signal strength and/or quality of other BSs in the same RAT in its surroundings and reports the measurements back to the serving BS. The radio network typically initiates HOs based on these measurements.

Figure 1:
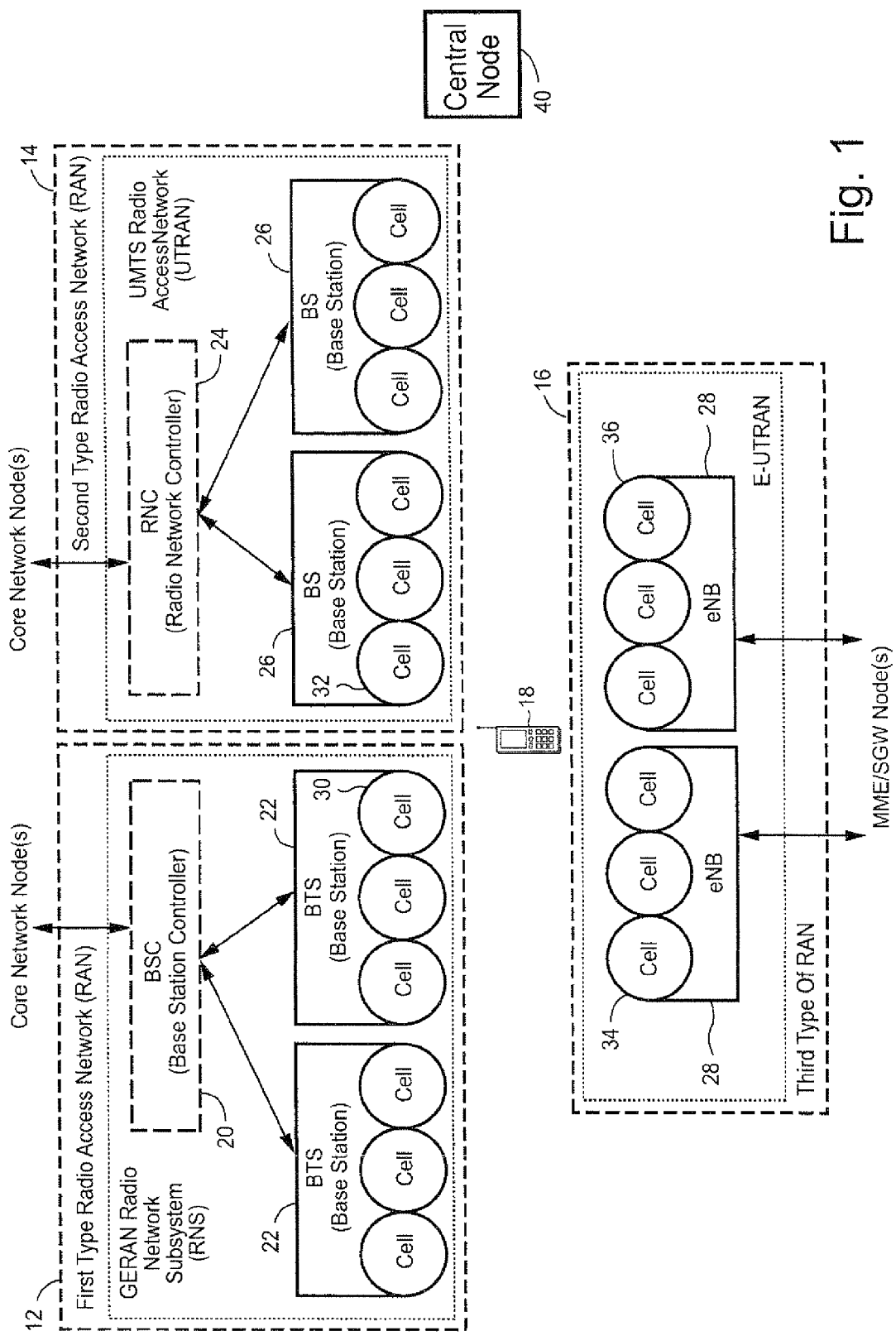
FIG. 1 is a function block diagram of a wireless communication system involving three different types of radio access networks.

FIG. 1 illustrates a non-limiting example situation where a mobile station 18 can obtain service from three different radio access technology (RAT) networks: a first type of radio access network (RAN) 12 corresponding to a GERAN, a second type of radio access network (RAN) 14 corresponding to a UTRAN, and a third type of radio access network (RAN) 16 corresponding to an E-UTRAN. The GERAN includes a base station controller (BSC) 20 coupled to multiple base stations (BTSs) 22, each base station serving multiple cells 30. The BSC 20 communicates with one or more core network nodes. The UTRAN includes a radio network controller (RNC) 24 coupled to multiple base stations (BSs) 26, each base station serving multiple cells 32. The RNC 24 communicates with one or more core network nodes. The E-UTRAN includes multiple base stations (eNBs) 28, each base station serving multiple cells 34. Each eNB 28 communicates with a mobility management entity (MME)/serving gateway (S-GW) node(s). A central node 40 such as an operations maintenance and/or management node is shown and can communicate with one or more nodes in each RAN.

As the MS 18 moves, radio conditions vary, service requirements change, etc., there are opportunities for Inter-RAT (IRAT) handover. In case the signal strength and/or quality of the serving BSs in the current RAT reaches an Inter-RAT (IRAT) measurement threshold (there may be more than one IRAT measurement threshold), the serving BS requests the MS to also perform measurements on the signal strength and/or quality of BSs in other RATs in its surroundings. The measurement results may be reported to the serving BS to use in order to initiate IRAT HO to a suitable IRAT BS. An Intra-RAT HO decision may be based on relative threshold(s) for measured signal strength and/or quality for the serving cell and the candidate cell, while the IRAT HO decision typically is based on absolute thresholds on the measured signal strength and/or quality of the different RATs.

Figure 2:
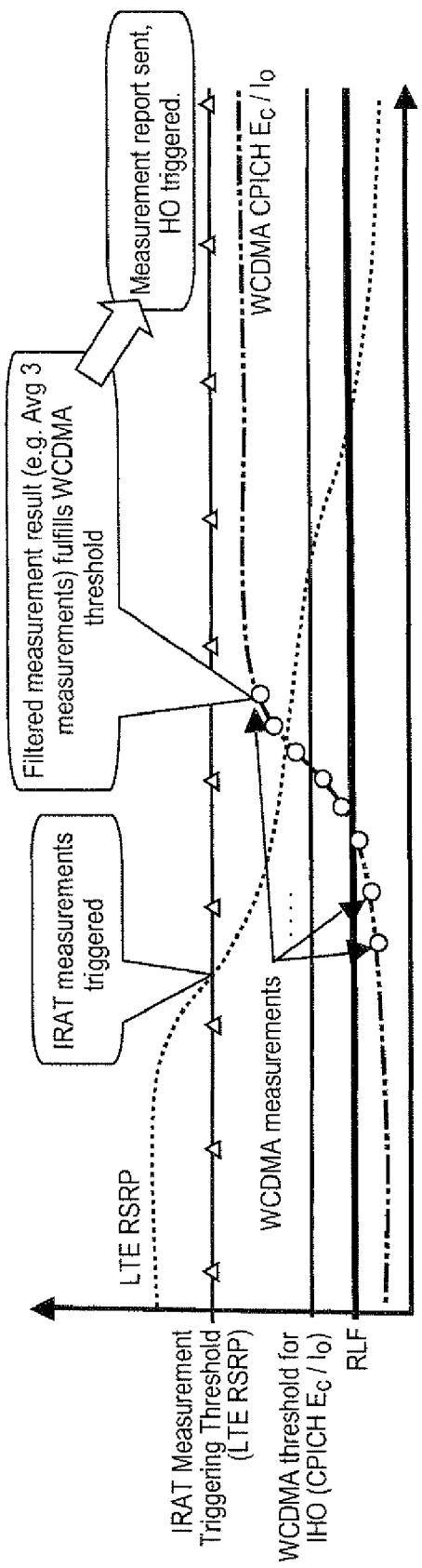
FIG. 2 is an illustration showing an IRAT measurement triggering threshold for RSRP in E-UTRAN and measurements on UTRAN leading to handover (HO)

FIG. 2 shows an example for E-UTRAN where a reference signal received power (RSRP) threshold, i.e., the received signal strength from the serving eNodeB, is used to trigger IRAT measurements. An example of an IRAT handover measurement triggering threshold that also may be optimized is a reference signal received quality (RSRQ) threshold. If the MS can measure different RATs, the BS ranks them and requests the MS to measure the highest prioritized RAT. The MS reports the first IRAT cell for which the filtered measurement result (typically based on a number of measurements) fulfills a threshold on the signal strength, and handover is performed to that cell.

The technology described in this application aims to optimize one or more IRAT measurement triggering thresholds, for example the LTE RSRP triggering threshold shown in FIG. 2. The setting of the IRAT threshold for IRAT HO (IHO), for example the WCDMA common pilot channel (CPICH) signal-to-interference ratio ($E_C/I_0$) threshold, is assumed to be tuned to a suitable value.

It is advantageous to use a well-tuned IRAT measurement triggering threshold. IRAT HO measurements require the BS to switch to a different frequency than the current RAT, and therefore, restricted or no communication with the serving BS is possible during the measurement period. Consequently, it is undesirable to trigger IRAT measurements when it is likely that no IRAT can be found. Furthermore, a higher prioritized RAT is likely to give a better performance than a lower prioritized RAT. Accordingly, IRAT HO and also IRAT measurements should not be triggered when not needed, i.e., too early IRAT measurement triggering is undesired. On the other hand, too late triggered IRAT measurements may result in radio link failure (RLF), as the MS may not be able to find a suitable IRAT HO candidate and execute the IRAT HO before the serving cell signal strength or quality is too low to achieve adequate service.

Different BSs serving different cells may require different settings for the IRAT measurement thresholds as illustrated in the following examples and in FIGS. 3-6. In these figures, the shaded intervals indicate where the IRAT measurement threshold may be set without violating the example constraints. Time is plotted in the horizontal direction and helps show in these and in subsequent figures the time needed by a MS to measure another RAT and report the measurement to the serving RAT plus the time needed by the serving RAT to process the measurement and command the MS to move to another RAT (by sending the IRAT HO command).

Figure 3:
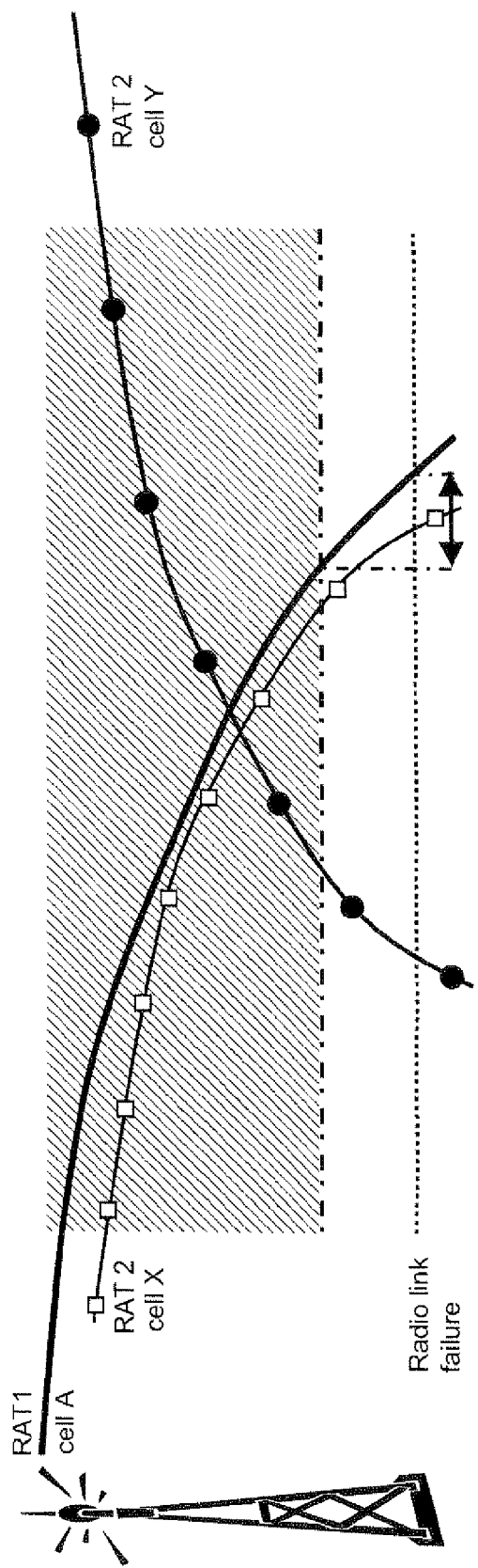
FIG. 3 is an illustration showing, for a cell on the coverage edge of the serving RAT1, triggering of IRAT measurements on RAT2 so that there is enough time to perform IRAT HO before the MS leaves the serving RAT1 coverage and the MS experiences radio link failure.
Figure 4:
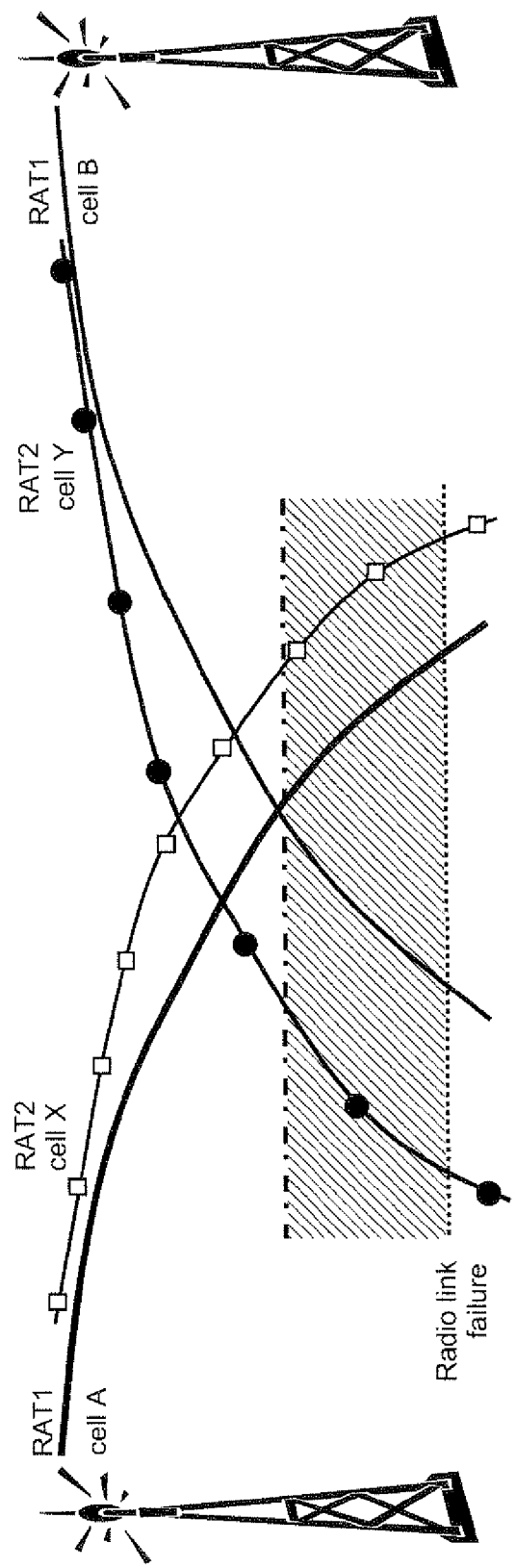
FIG. 4 is an illustration showing that for a cell in the coverage center of the serving RAT1, IRAT measurements on RAT2 should not be triggered when moving between cells of RAT1.

As shown in FIG. 3, the IRAT measurement triggering thresholds for a cell on the coverage edge of the serving RAT may be set so that IRAT HO is performed before the MS leaves serving RAT coverage. In other words, for a cell on the coverage edge of the serving RAT1, IRAT measurements on RAT2 should be triggered so that there is time enough to perform IRAT HO before the MS leaves the serving RAT1 coverage and the MS experiences RLF.

Further, the thresholds should be set so that IRAT HO measurements are not triggered when moving between cells of the same RAT. See the example in FIG. 4. For a cell in the coverage center of the serving RAT1, IRAT measurements on RAT2 should not be triggered when moving between cells of RAT1.

Figure 5:
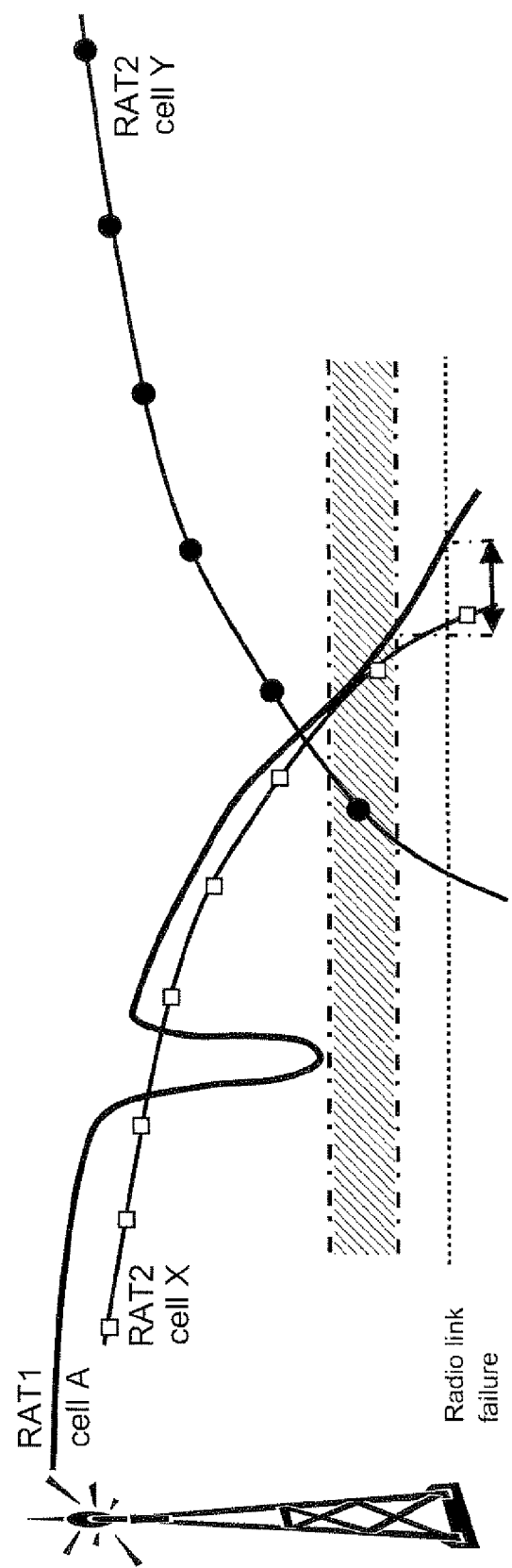
FIG. 5 is an illustration showing that IRAT measurements should be avoided in case the serving RAT signal strength drops but recovers without risking radio link failure.

In case where there is a temporary signal strength drop without risk for RLF in the serving RAT, IRAT measurements should also not be triggered as shown in FIG. 5. This leads to an interval within which it is appropriate to set the IRAT measurement threshold.

Figure 6:
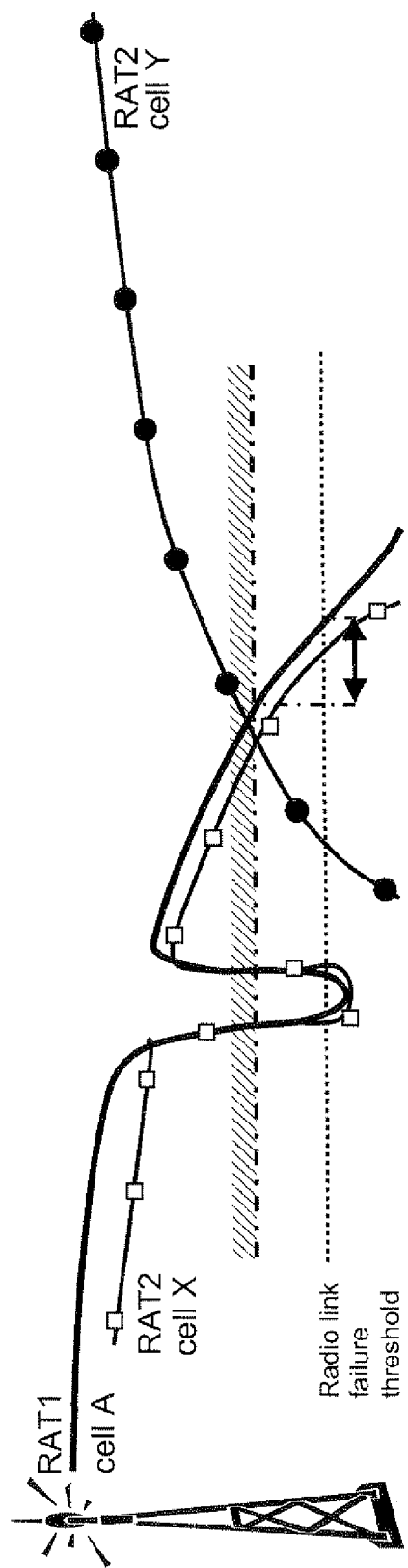
FIG. 6 is an illustration showing that the IRAT measurement threshold should not be set higher due to coverage holes resulting in insufficient signal strength from all RATs.

There may be a situation in which many MSs in a cell experience bad signal strength from all "fallback" RATs, for example when the MS is moving through in an underground tunnel. Although there is probably a need for expanding the coverage to accommodate the tunnel environment, the IRAT measurement triggering threshold should not be affected by such coverage holes because IRAT measurement triggering in such places would only cause unnecessary IRAT measurements where no fallback RAT can be found. As a result, the threshold should be optimized to avoid RLF in other parts of the cell where fallback RATs do exist. FIG. 6 illustrates that an IRAT measurement threshold should not be set higher due to coverage holes (resulting in insufficient signal strength from all RATs (RAT1 and RAT2 in the figure)) in order to avoid unnecessary measurements. At the same time, the measurement threshold should not be set too low so that there is enough time to perform IRAT HO before the MS leaves the serving RAT1 coverage and the MS experiences radio link failure.

Inter-RAT measurement triggering thresholds may be manually adjusted using network statistics, but setting the thresholds manually per cell is tedious and costly work. Alternatively, an excessively high default value for numerous cells may be set, but this often results in an inefficiently early IRAT HO measurement triggering and handover. A better approach is an automated approach where the base station itself configures the IRAT measurement triggering threshold(s).

Automatic setting of the threshold(s) for triggering measurements of signal strength/quality from other RATs that are needed for IRAT mobility is now described. An example threshold is an RSRP threshold for IRAT measurements in E-UTRAN. The setting of the threshold(s) triggering IRAT measurements is automatically optimized and preferably performed for each BS. Optimize, optimized, and optimization in the context of this application mean set, adjusted, determined, or tuned for a desired performance and do not require that every or any performance parameter be or reach its best possible value.

Initially, constraints on the optimization of the IRAT measurement triggering threshold(s) are set, and a start value for the optimization of the IRAT measurement triggering threshold(s) is provided. Input information, sometimes referred to in this application as statistics, needed for the optimization of the IRAT measurement triggering threshold(s) are then collected and/or determined, and new IRAT measurement triggering threshold(s) are determined and set. As a beneficial result, operator expenses for adjusting the IRAT measurement triggering threshold(s) to appropriate values are reduced as compared to manual setting, and the efficiency loss caused by non-optimized IRAT measurement triggering threshold(s) is reduced or minimized.

To support seamless mobility, a BS can request a MS to measure the signal strength and/or quality of BSs in other RATs. These IRAT measurements are triggered when the signal strength/quality of the serving BS reaches (one of) the IRAT measurement threshold(s). The technology in this application enables autonomous, computer-implemented setting of these IRAT measurement thresholds for each BS adjusted to the existing radio environment and traffic in the cell of that BS. Such threshold(s) may be optimized for example in accordance with the following procedures.

Figure 7:
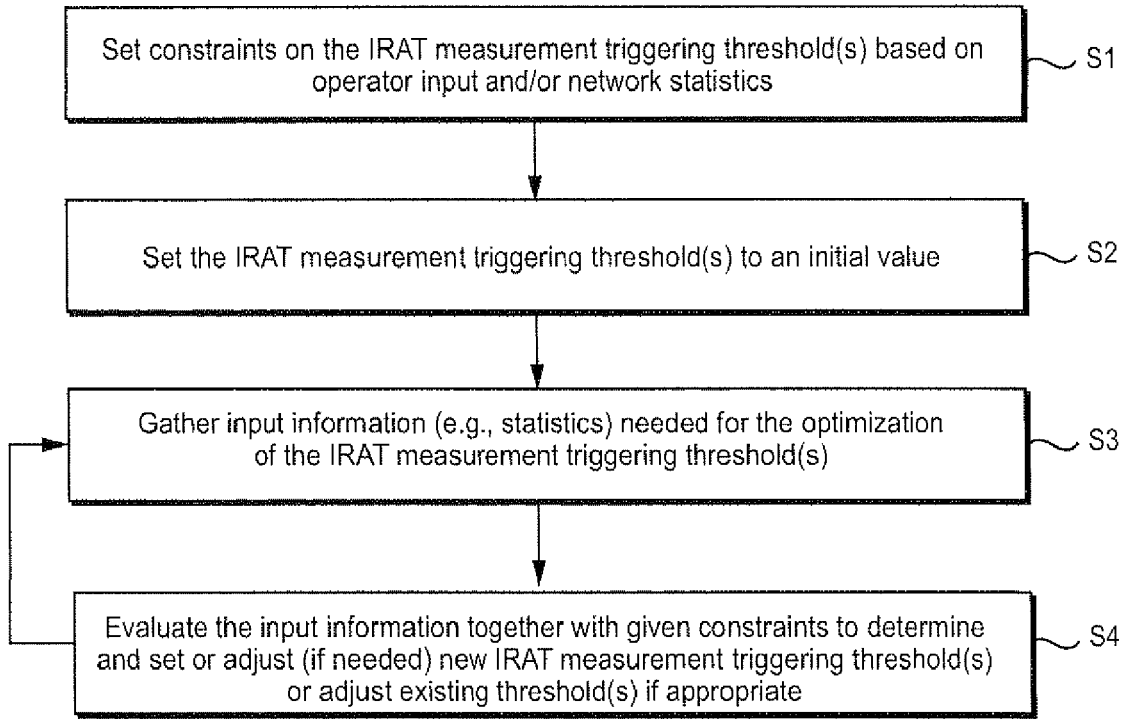
FIG. 7 is a flowchart diagram illustrating non-limiting, example procedures for determining IRAT measurement triggering threshold(s)

Procedures for the automatic, computer-implemented determination of optimal IRAT measurement triggering threshold(s) are outlined in flowchart form in FIG. 7. In step S1, constraints are set for one or more IRAT measurement triggering threshold(s) based on operator input and/or network statistics. The IRAT measurement triggering threshold(s) is (are) then set to an initial value (step S2). Input information (statistics) needed for the IRAT measurement triggering threshold(s) optimization is gathered (step S3). That input information is analyzed together with the set constraints from S1 to determine and set or adjust (if needed) IRAT measurement triggering threshold(s) (step S4).

Figure 8:
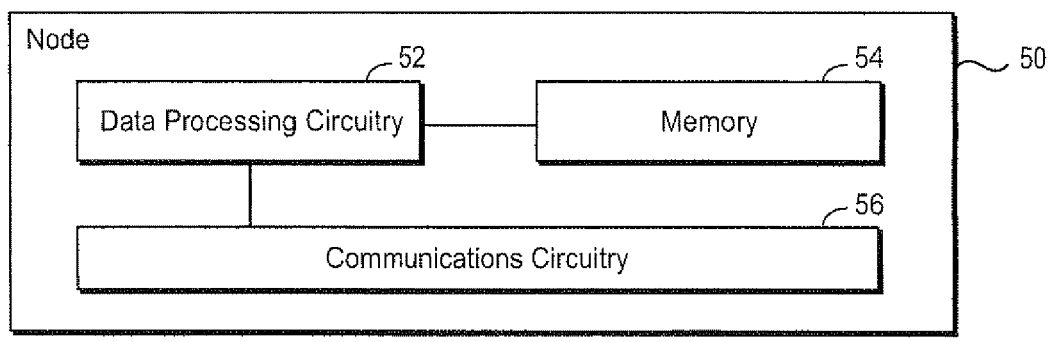
FIG. 8 is a non-limiting, example function block diagram for possible use in performing the procedures outlined in FIG. 7.
Figure 9A:
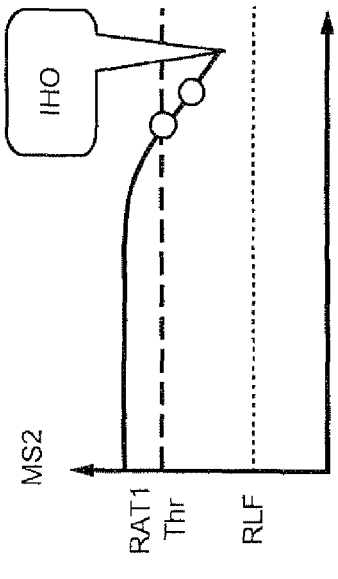
FIGS. 9A-9D illustrate four different MSs with signal strength/quality varying with time relative to a measurement threshold and a radio link failure level.
Figure 9B:
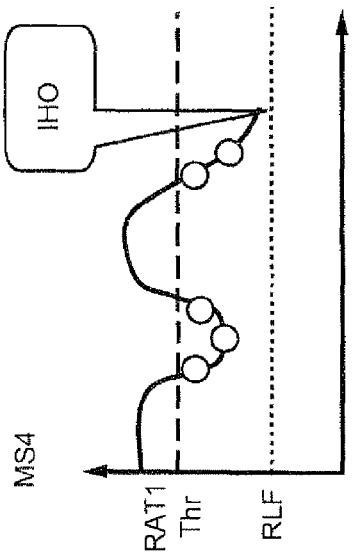
Figure 9C:
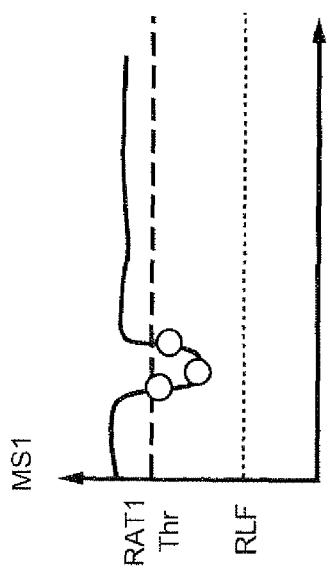
Figure 9D:
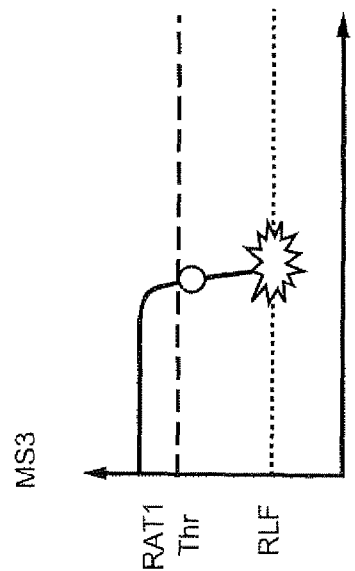

One or more nodes may be used to implement the steps in FIG. 7. For example, they may be implemented in the central node 40 shown in FIG. 1, a core network node, a RAN controller node like a BSC or RNC, or in one or more base stations. A function block diagram for such a node 50 is shown in FIG. 8. Node 50 includes data processing circuitry 52 coupled to a memory 54 for storing data and/or program instructions for performing operations needed to implement the steps in FIG. 7. The data processing circuitry 52 is also coupled to communications circuitry 56 for communicating with other nodes in the overall system, including among other things to receive measurement reports from MSs and to send messages that include threshold triggering information. If the node 50 is a base station, that communications circuitry 56 also includes suitable radio transceiving circuitry for conducting radio communications with MSs.

Returning to the procedures outlined in FIG. 7, the initial step S1 of setting appropriate constraints is now described in more detail. An IRAT measurement triggering threshold, Thr, is optimized within an interval which is set based on operator input and/or network statistics: $Thr_{min} \leq Thr \leq Thr_{max}$. Although $Thr_{min}$ and $Thr_{max}$ may be set to any desired values, the maximum IRAT measurement triggering threshold, $Thr_{max}$, may for example be set at a level where the current RAT coverage is considered to be adequate and there is time for a fast moving MS to find an IRAT candidate cell and perform. IRAT HO even if the current RAT signal strength drops quickly. For example, $Thr_{max}$ could be set just below the minimum signal strength/quality planned for the network. If such value is not available, $Thr_{max}$ could be based on intra-RAT HO statistics, for example as a certain (e.g., low) percentage of the minimum signal strength/quality values of the serving BSs before HO is performed.

The minimum IRAT measurement triggering threshold, $Thr_{min}$, is preferably be set so that IRAT measurement is triggered before the signal strength/quality of the serving cell reaches a signal strength/quality causing RLF. For example, $Thr_{min}$ could be set to the signal strength/quality limit for RLF plus a safety margin depending on the measurement and IRAT HO execution time, $Thr_{min}=RLF_{limit}+margin$. If no signal strength/quality limit for RLF is available, this could be based on network or cell statistics, for example as a certain (high) percentile of last reported signal strength/quality received by MSs in the cell before RLF.

The next step S2 of setting one or more initial threshold values is now described in more detail. Before entering the optimization loop, the IRAT measurement triggering threshold, Thr, is set to an initial value, $Thr_{start}$. Again, a too low IRAT measurement triggering threshold could result in a high number of RLFs, while a too high IRAT measurement triggering threshold could result in inefficient utilization of resources. Because a too high IRAT measurement triggering threshold typically has the least severe drawbacks, the initial IRAT measurement triggering threshold value may be preferably set to the maximum IRAT measurement triggering threshold, $Thr_{start}=Thr_{max}$.

During the statistics collection in step S3, statistics indicating the effects and efficiency of the current IRAT measurement triggering threshold setting are gathered. In one example embodiment, these statistics are used for the threshold calculation and then erased or overwritten. In another example embodiment, these statistics are saved together with the threshold settings, for a certain period of time, $T_s$, to be used in following threshold calculations. One or more of the statistics described are gathered during the statistics collection, examples of which are now described.

One example statistic can be radio link failure rate, $R_{RLF}$, a metric associated with radio link failures in the network. For example, different definitions of a radio link failure rate are possible such as: $R_{RLF}=N_{RLF}/N_I$, where $N_{RLF}$ is the number of radio link failures during a given time T and $N_I$ is the number of initialized sessions during time T. Another example definition is $$R_{RLF} == N_{RLF} \bigg/ \sum_{i=1}^{N_I} t_{Si},$$

where $t_{Si}$ is the duration of session i. This second definition represents the inverted mean time elapsed between radio link failures during a given time T.

The first definition, i.e. the number of radio link failures divided by number of initiated sessions, can be somewhat misleading in case of packet data calls, since data sessions can be very short and the number of initiated packet data sessions can be very high. Another alternative is to consider only sessions longer than a given time $T_{1s}$: $R_{RLF}=N_{RLF,long}/N_{I,long}$, where $N_{RLF,long}$ is the number of radio link failures for sessions longer than $T_{1s}$, during a given time T and $N_{I,long}$ is the number of initialized sessions longer than $T_{1s}$, during time T. Although a high value on $R_{RLF}$ could indicate a poorly configured IRAT measurement triggering threshold, it could also be due to other causes.

Another example statistics metric is IRAT HO measurement efficiency (IME). The IRAT HO measurement efficiency metric indicates the efficiency of IRAT measurement triggering that actually results in a found IRAT HO candidate BS. For RATs where a MS performs IRAT measurements, a report to the BS is only triggered when a good enough IRAT HO candidate cell is found. The IME can also be described as the report triggering ratio, $ME=R_{RT}$. For example, this can be given by:

$$R_{RT}=N_R/N_M \text{ for } N_M \neq 0 \text{ and } R_{RT}=1 \text{ for } N_M=0$$

where $N_R$ is the number of IRAT measurement report triggerings in a cell, and $N_M$ is the number of IRAT measurement triggerings in a cell.

In the above example expression, an IRAT measurement triggering refers to the triggering of a series of consecutive IRAT measurements. Consider an example with a BS serving four MSs, each with a signal strength/quality varying with time as illustrated in FIGS. 9A-9D, respectively. Assume that an MS performing IRAT measurements will trigger a report to the BS only when a good enough IRAT HO candidate cell is found, and further assume that the threshold indicating a good enough IRAT signal strength/quality is well tuned.

MS1 experiences a temporary drop in the signal strength/quality and IRAT measurements are triggered, but stop before finding a suitable IRAT HO candidate BS once the signal strength/quality goes up again. This gives $N_M=1$ and $N_R=0$ for MS1. For MS2, the signal strength/quality goes down below the threshold Thr and IRAT measurements are triggered resulting in an IRAT measurement report and IRAT HO (MO). This gives $N_M=1$ and $N_R=1$ for MS2. In a different part of the cell, MS3 experiences a very fast signal strength/quality drop such that no IRAT HO candidate is found even though IRAT measurements are triggered. MS3 ends up in RLF and this results in $N_M=1$ and $N_R=0$ for MS3. The fourth MS in the cell, MS4, first experiences a temporary drop in the signal strength/quality and IRAT measurements are triggered, but stops before finding a suitable IRAT HO candidate BS as the signal strength/quality goes up again. After a while, the signal strength/quality goes down again, and IRAT measurements are triggered a second time, eventually leading to an IRAT measurement report and IRAT HO. This gives $N_M=2$ and $N_R=1$ for MS4. All together for the cell, $N_M=1+1+1+2=5$ and $N_R=0+1+0+1=2$, resulting in a value $R_{RT}=N_R/N_M=2/5=0.4$. The resulting IRAT HO measurement efficiency (IME) is 0.4.

An ideal IRAT measurement triggering threshold would result in an IRAT HO measurement efficiency of one, IME=1, meaning that all IRAT measurement triggerings result in a found IRAT HO candidate, though an optimal IRAT measurement triggering threshold might still be satisfactory if it results in an IRAT HO measurement efficiency of less than one. For example, a value of IME=1 could also be achieved when the IRAT measurement triggering threshold is set too high, meaning that IRAT measurements and hence also IRAT HO are performed earlier than necessary, leading to an inefficient utilization of available resources.

In a case of more than one IRAT measurement threshold, the IRAT HO measurement efficiency, IME, may be calculated separately for each threshold depending on which thresholds are triggered when the IRAT HO candidate cell is found. For example, for E-UTRAN, IME=$R_{RT}$ may be derived separately for both IRAT measurement triggering based on RSRP and IRAT measurement triggering based on RSRQ: $R_{RT,RSRP}=N_R/N_{M,RSRP}$ for $N_{M,RSRP}\neq 0$ and $R_{RT,RSRQ}=N_R/N_{M,RSRQ}$ for $N_{M,RSRQ}\neq 0$.

Another example statistics metric is All RAT signal Drop ratio, $R_{AM}$, which indicates how large a portion of the RLFs in the cell that occurred due to a signal strength and/or quality drop was also experienced in fallback RAT(s) as well. A high all RAT signal drop ratio, $R_{ARD}$, indicates that there are locations where MSs experience signal strength/quality drops in both serving RAT and fallback RATs.

Another example is an Early IRAT Handover Ratio, $R_{EIHO}$, which is a metric indicating how large a portion of the MSs for which IRAT HO have been performed where the IRAT HO was triggered earlier than necessary. A high early IRAT handover ratio, $R_{EIHO}$, indicates a too high IRAT measurement threshold.

A new threshold is calculated in step S4 based on one or more statistics. Non-limiting example statistic metrics include: radio link failure rate, IRAT HO measurement efficiency, All RAT signal drop ratio, and/or early IRAT handover ratio gathered while using a certain IRAT HO triggering threshold setting. A determination is made whether the current IRAT HO triggering threshold should be decreased, increased, or left unchanged for the next statistics collection period and the threshold is changed accordingly (if necessary). A threshold parameter Thr(k) denotes the IRAT measurement triggering threshold for a threshold optimization "loop" k. For each threshold optimization loop k, the threshold derivation is performed based on the following evaluations: (1) evaluate whether a threshold increase is desired (not needed if already concluded that a threshold decrease is desired), and (2) evaluate whether a threshold decrease is desired (not needed if already concluded that a threshold increase is desired).

The order in which the evaluations are performed is arbitrary and both evaluations do not always need to be performed depending on the result on the other evaluation. The two evaluations may also be integrated with each other to avoid performing the same evaluation steps more than one time. The threshold determination following the above evaluation (s) may be performed for example as now described.

In case a threshold increase is desired but the current threshold is already set to $Thr_{max}$, a warning could be issued, and the threshold remains set to $Thr_{max}$. If $Thr(k)<Thr_{max}$, the threshold is increased:

$$Thr(k+1)=Thr(k)+\delta_I \text{ if } Thr(k)+\delta_I \leq Thr_{max}$$

$$Thr(k+1)=Thr_{max} \text{ if } Thr(k)+\delta_I > Thr_{max}$$

where $\delta_I$ is the increase step size.

In case a threshold decrease is desired but the current threshold is already set to $Thr_{min}$, the threshold remains set to $Thr_{min}$. If $Thr(k)>Thr_{min}$, the threshold is decreased:

$$Thr(k+1)=Thr(k)+\delta_D \text{ if } Thr(k)-\delta_D \geq Thr_{min}$$

$$Thr(k+1)=Thr_{min} \text{ if } Thr(k)-\delta_D < Thr_{min}$$

where $\delta_D$ is the decrease step size.

In a case of no threshold increase or decrease, the threshold remains set to the current value, Thr(k+1)=Thr(k). After a number of threshold processing loops with no threshold change, the IRAT measurement triggering threshold processing may be turned off or put in a low intensity mode.

Preferably, the increase and the decrease step size may be set to the same value, $\delta=\delta_I=\delta_D$ so that $Thr_{max}=Thr_{min}+n\cdot\delta$, where n is an integer. But different step sizes may be used.

Figure 10:
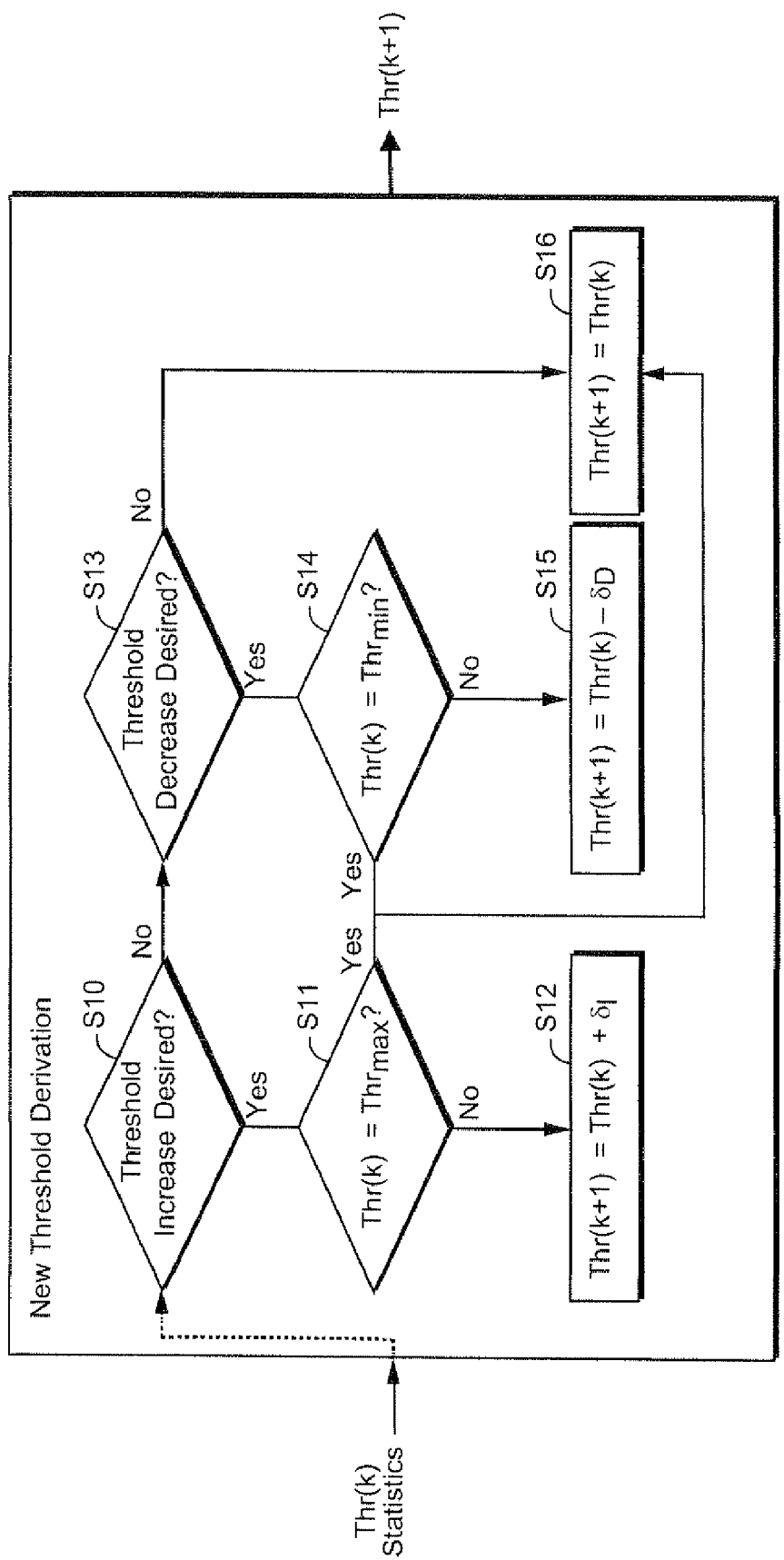
FIG. 10 is a flowchart diagram illustrating non-limiting, example procedures for determining a new measurement triggering threshold using two separate evaluations.

Example procedures for performing a new threshold calculation are shown in FIG. 10 in steps S10-S16 using the non-limiting example assumption that the increase and the decrease step size are set to the same value, $\delta=\delta_I=\delta_D$ so that $Thr_{max}=Thr_{min}+n\cdot\delta$, where n is an integer.

Figure 11:
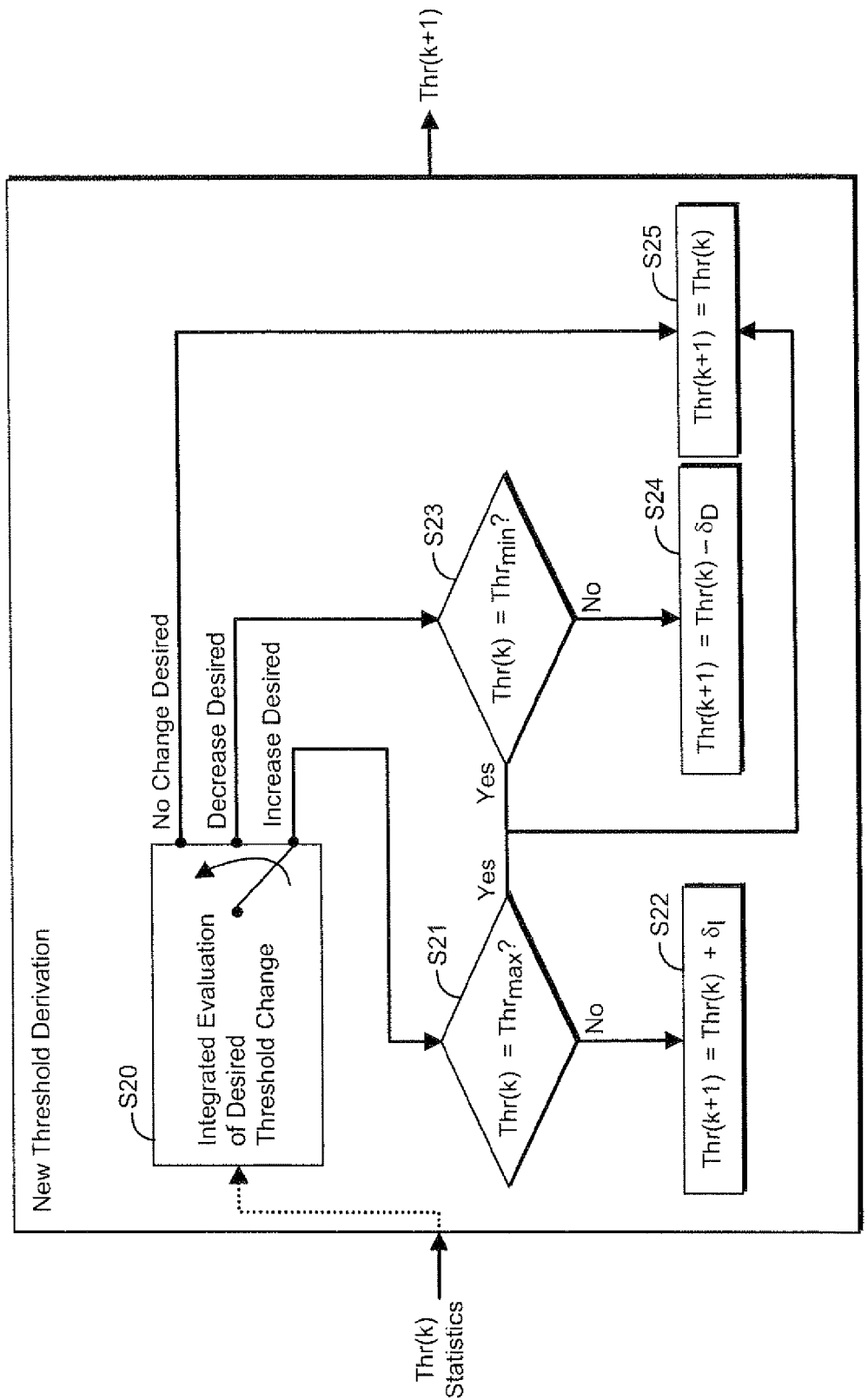
FIG. 11 is a flowchart diagram illustrating non-limiting, example procedures for determining a new measurement triggering threshold using integrated evaluation of desired threshold change.

The two evaluations described above can be performed using different methods. The presented methods are examples and may be combined arbitrarily, giving an integrated evaluation instead of two separate evaluations. An example of the new threshold derivation using integrated evaluation of desired threshold change is shown in FIG. 11 and outlined in steps S20-S25 using the non-limiting example assumption that the increase and the decrease step size are set to the same value, $\delta=\delta_I=\delta_D$ so that $Thr_{max}=Thr_{min}+n\cdot\delta$, where n is an integer. The evaluation of whether a threshold increase is desired can be based on statistics giving one or more of the following metrics: radio link failure rate, IRAT HO measurement efficiency, All RAT signal drop ratio, and/or early IRAT handover ratio.

A number of example methods to evaluate whether a threshold increase (I) is desired are now described. They can be used separately or be combined in order to achieve a more confident solution.

A first threshold increase method I1 evaluates whether a threshold increase is desired using Radio Link Failure Rate. Let a high radio link failure rate be defined by $R_{RLF} \geq R_{RLF,high}$, where $R_{RLF,high}$ could be a preconfigured value or be based on statistics in surrounding cells in case of a mature network. A high radio link failure rate, i.e., $R_{RLF} \geq R_{RLF,high}$, indicates that a threshold increase is desired.

A second threshold increase method I2 evaluates whether a threshold increase is desired using Radio Link Failure Rate from current and previous measurement triggering optimization loops. Let $Thr_i=Thr(k)$ be the current setting on the IRAT HO measurement triggering threshold. Let $Thr_{i+1}=Thr_i+\delta_I$ be the threshold $Thr_i$ increased by one step. Let $R_{RLF,i}$ be the radio link failure rate achieved for $Thr_i$. A threshold increase from $Thr_i$ to $Thr_{i+1}$ has effect if $R_{RLF,i+1}$ is lower than $R_{RLF,i}$. Hence, a known $R_{RLF,i+1}$ where $R_{RLF,i+1}<R_{RLF,i}$ indicates that a threshold increase is desired. In one example embodiment using this method, a threshold increase could also be desired for statistics collection purposes in case $R_{RLF,i+1}$ is unknown.

A third threshold increase method I3 evaluates whether a threshold increase is desired using All RAT Signal Drop Ratio. Let a low all RAT signal drop ratio be defined by $R_{ARD} \leq R_{ARD,low}$, where $R_{ARD,low}$ could be a preconfigured value, or be based on statistics in surrounding cells in case of a mature network. A low all RAT signal drop ratio, i.e., $R_{ARD} \leq R_{ARD,low}$ could indicate that a threshold increase is desired. Preferably this third method is used in combination with some other method indicating that a threshold increase is desired, e.g. Method I1.

A fourth threshold increase method I4 evaluates whether a threshold increase is desired using IRAT HO Measurement Efficiency. Let a low IRAT HO measurement efficiency, IME, be defined by $IME \leq IME_{low}$, where $IME_{low}$ could be a pre-configured value, or be based on statistics in surrounding cells in case of a mature network. A low IRAT HO measurement efficiency, i.e., $IME \leq IME_{low}$, could indicate that a threshold increase is desired. Since a low IRAT HO measurement efficiency could also indicate that a threshold decrease is desired, the fourth method is preferably used in combination with another method evaluating whether a threshold increase is desired.

The evaluation of whether a threshold decrease is desired can be based on statistics giving one or more of the following example metrics: radio link failure rate, IRAT HO measurement efficiency, All RAT signal drop ratio, and/or early IRAT handover ratio. Below a number of example methods to evaluate whether a threshold decrease (D) is desired are now described. They can be used separately or be combined in order to achieve a more confident solution.

Example threshold decrease method D1 evaluates whether a threshold decrease is desired using Radio Link Failure Rate. Let a low radio link failure rate be defined by $R_{RLF}<R_{RLF,low}$, where $R_{RLF,low}$ may be a preconfigured value, or be based on statistics in surrounding cells in case of a mature network. A low radio link failure rate, i.e., $R_{RLF}<R_{RLF,low}$, indicates that a threshold decrease is desired.

Example threshold decrease method D2 evaluates whether a threshold decrease is desired using Radio Link Failure Rate from current and previous optimization loops. Let $Thr_i=Thr(k)$ be the current setting on the IRAT HO measurement triggering threshold, $Thr_{i-1}=Thr_i-\delta_D$ be the threshold $Thr_i$ decreased by one step, and $R_{RLF,i}$ be the radio link failure rate achieved for $Thr_i$. A threshold decrease from $Thr_i$ to $Thr_{i-1}$ is efficient unless $R_{RLF,i-1}$ is higher than $R_{RLF,i}$. Hence, a high radio link failure rate and a known $R_{RLF,i-1}$ where $R_{RLF,i-1} \leq R_{RLF,i}$ indicates that a threshold decrease is desired. In one non-limiting example embodiment using this method, a threshold decrease may also be desired for statistics collection purposes in case $R_{RLF,i-1}$ is unknown.

Example threshold decrease method D3 evaluates whether a threshold decrease is desired using All RAT Signal Drop Ratio. Let a high all RAT signal drop ratio be defined by $R_{ARD}>R_{ARD,high}$, $R_{ARD,high}$ may be a preconfigured value, or be based on statistics in surrounding cells in case of a mature network. A high all RAT signal drop ratio, i.e., $R_{ARD}>R_{ARD,high}$, indicates that a threshold decrease is desired. Preferably, but not necessarily, this method may be used in combination with some other method indicating that a threshold decrease is desired.

Example threshold decrease method D4 evaluates whether a threshold decrease is desired using Early IRAT Handover Ratio. Let a high early IRAT handover ratio, $R_{EIHO}$, be defined by $R_{EIHO}>R_{EIHO,high}$, where $R_{EIHO,high}$ may be a preconfigured value, be a value set by the early handover evaluation unit, or be based on statistics in surrounding cells in case of a mature network. A high early IRAT handover ratio, i.e., $R_{EIHO}>R_{EIHO,high}$, indicates that a threshold decrease is desired.

Example threshold decrease method D5 evaluates whether a threshold decrease is desired using IRAT HO Measurement Efficiency. Let a low IRAT HO measurement efficiency, IME, be defined by $IME<IME_{low}$, where $IME_{low}$ could be a pre-configured value, or be based on statistics in surrounding cells in case of a mature network. A low IRAT HO measurement efficiency, i.e., $IME<IME_{low}$, may indicate that a threshold decrease is desired. Since a low IRAT HO measurement efficiency may also indicate that a threshold increase is desired, this method is preferably used in combination with another method evaluating whether a threshold decrease is desired.

Figure 12:
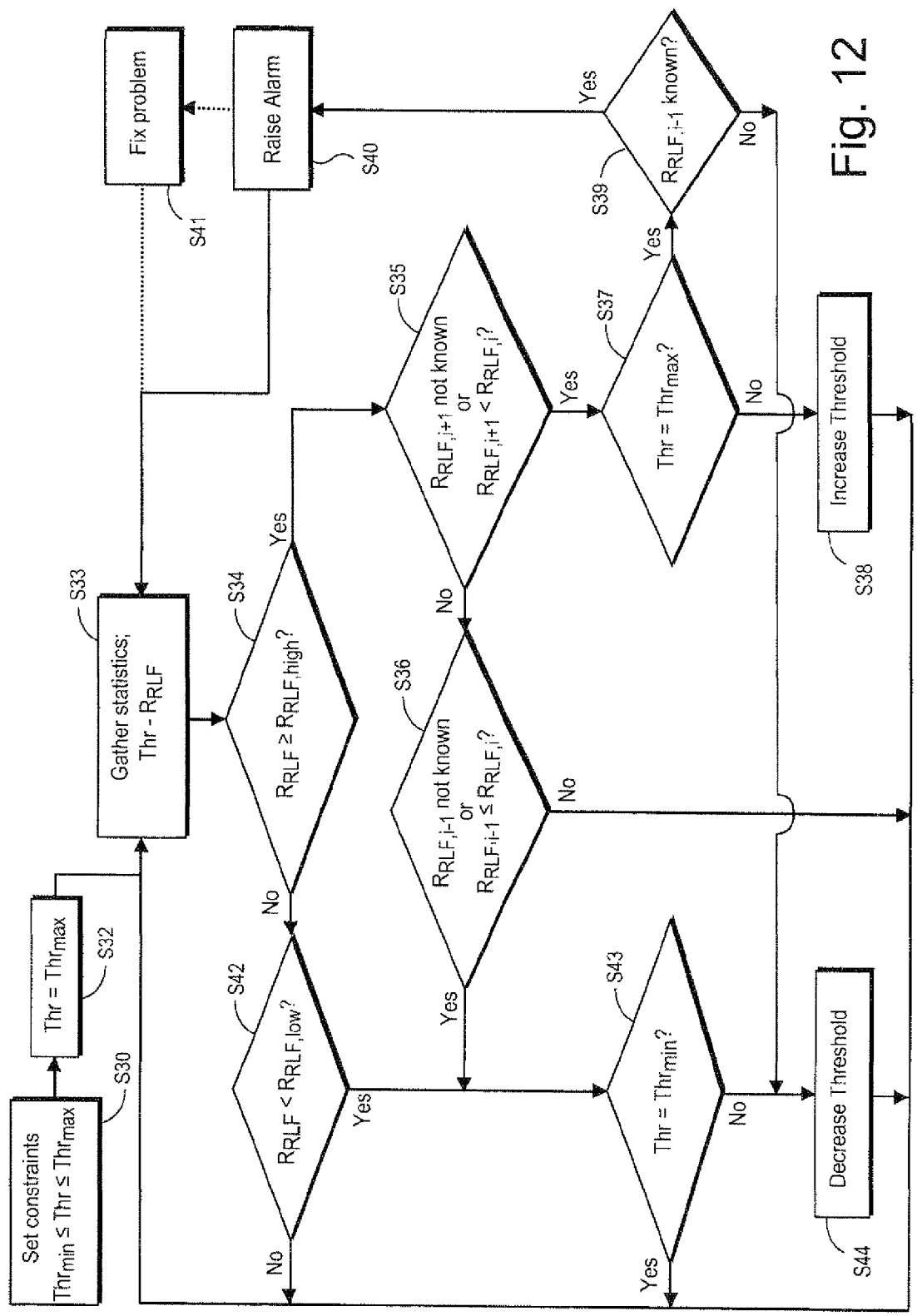
FIG. 12 is a flowchart diagram illustrating non-limiting, example procedures for adjusting a measurement triggering threshold in accordance with a first example 1.

A first example (1) using integrated evaluation of desired threshold change as shown and described in FIG. 12. In this case, the integrated evaluation includes a combination of the following methods: threshold increase method I1 evaluates whether a threshold increase is desired using Radio Link Failure Rate; threshold increase method I2 evaluates whether a threshold increase is desired using Radio Link Failure Rate from current and previous optimization loops; threshold decrease method D1 evaluates whether a threshold decrease is desired using Radio Link Failure Rate; and threshold decrease method D2 evaluates whether a threshold decrease is desired using Radio Link Failure Rate from current and previous optimization loops.

Consider one of the situations described above and illustrated in FIG. 6 where the cell with one or more coverage holes results in insufficient signal strength from all RATs. The insufficient signal strength from all RATs results in a $R_{RLF} \geq R_{RLF,high}$ independently of the threshold setting. Initially, constraints on the IRAT measurement triggering threshold are set based on operator input and/or network statistics: $Thr_{min} \leq Thr \leq Thr_{max}$ (step S30). The IRAT measurement triggering threshold Thr is set to an initial value for a first measurement triggering threshold optimization loop (1): $Thr(1)=Thr_0=Thr_{max}$ in step S32.

FIG. 13 illustrates RAT1 and RAT2 signal strength/quality and threshold setting for example 1 and the first threshold optimization loop (1). Radio link failure (RLF) statistics are gathered in step S33 for the threshold value of $Thr_0$. A determination is made in step S34 whether $R_{RLF} \geq R_{RLF,high}$. If not, a determination is made in step S42 whether $R_{RLF} < R_{RLF,low}$. If the answer is No, the threshold remains unchanged, and a second threshold optimization loop (2) is started in step S33 with Thr(2)=Thr$_0$. If the determination in step S42 instead is that $R_{RLF} < R_{RLF,low}$, then a determination is made in step S43 whether Thr=Thr$_{min}$. If it is, the threshold remains unchanged, and the second optimization loop (2) is started in step S33 with Thr(2)=Thr$_0$. If not, the threshold for optimization loop (2) is decreased in step S44, giving Thr(2)=Thr$_{-1}$.

But because of coverage holes resulting in insufficient signal strength from all RATs in this example, the answer to the determination in step S34 is likely to be Yes. Thus, a determination is made in step S35 whether $R_{RLF,i+1}$ is not known or if $R_{RLF,i+1} < R_{RLF,i}$. Since $R_{RLF,1}$ is not yet known, then a determination is made in step S37 whether Thr=Thr$_{max}$. In this case, Thr(1)=Thr$_0$=Thr$_{max}$, so the answer is Yes. A determination is made whether $R_{RLF,i-1}$ known, and since it is not, the threshold for optimization loop 2 is decreased in step S44: Thr(2)=Thr$_{-1}$. Otherwise, an alarm would be raised in step S40 so that the problem with a high radio link failure rate even for the maximum threshold setting can be fixed in step S41. FIG. 14 shows RAT1 and RAT2 signal strength/quality and threshold setting for optimization loop (2) being adjusted downward as a result of completing optimization loop (1) in example 1.

For the second optimization loop 2, control returns to the gathering statistics step S33. There is still some margin before the RAT1 signal strength/quality approaches radio link failure level at RAT1's coverage edge, i.e., $R_{RLF,-1}=R_{RLF,0}$. Statistics are gathered resulting in the following threshold→$R_{RLF}$ values of Thr$_{-1}$→$R_{RLF,-1}=R_{RLF,0} \geq R_{RLF,high}$ and Thr$_0$→$R_{RLF,0} \geq R_{RLF,high}$. A determination is made in step S34 whether $R_{RLF} \geq R_{RLF,high}$. Because of coverage holes resulting in insufficient signal strength from all RATs in this example, the determination is Yes. A determination is made in step S35 whether $R_{RLF,i+1}$ is not known or if $R_{RLF,j+1} < R_{RLF,i}$? Since $R_{RLF,0}$ is known and $R_{RLF,-1}=R_{RLF,0}$, the answer is No. A determination is made in step S36 whether $R_{RLF,i-1}$ is not known or whether $R_{RLF,i-1} \leq R_{RLF,i}$. In this case, $R_{RLF,-2}$ is not known, so the answer is Yes. A determination is made in step S43 whether Thr=Thr$_{min}$. In this case, the answer is No, so the threshold is decreased even more in step S44 so that the threshold for optimization loop 3, Thr(3), is Thr$_{-2}$ as shown in FIG. 15. Note that the new threshold Thr(3) is now set below the dashed-dotted line and is thus outside of the "safe" zone.

For optimization loop 3, statistics are gathered in step S33 with a threshold set to Thr$_{-2}$. The margin before approaching radio link failures at RAT coverage edge is not large enough, and the number of RLFs at RAT coverage edge has increased. As a result, the gathered statistics result in threshold→$R_{RLF}$ values of Thr$_{-2}$→$R_{RLF,-2} > R_{RLF,-1} \geq R_{RLF,high}$, Thr$_{-1}$→$R_{RLF,-1}=R_{RLF,0} \geq R_{RLF,high}$ and Thr$_0$→$R_{RLF,0} \geq R_{RLF,high}$. A determination is made in step S34 whether $R_{RLF} \geq R_{RLF,high}$. Because of coverage holes resulting in insufficient signal strength from all RATs in this example, the determination is Yes. A determination is made in step S35 whether $R_{RLF,i+1}$ is not known or if $R_{RLF,i+1} < R_{RLF,i}$? In this case, $R_{RLF,-1}$ is known, but $R_{RLF,-1} < R_{RLF,-2}$, so the answer is Yes. Then a determination is made in step S37 whether Thr=Thr$_{max}$. In this case, the answer is No, and the threshold is increased for optimization loop 4 in step S38, i.e., Thr(4)=Thr$_{-1}$ as shown in FIG. 16.

For optimization loop 4, statistics are gathered in step S33 with a threshold set to Thr$_{-1}$. There is still some margin before the RAT1 signal strength/quality approaches radio link fail-ure level at RAT coverage edge, i.e., $R_{RLF,-1}=R_{RLF,0}$. Statistics are gathered providing threshold→$R_{RLF}$ values of Thr$_{-2}$→$R_{RLF,-2} > R_{RLF,-1} \geq R_{RLF,high}$, Thr$_{-1}$→$R_{RLF,-1}=R_{RLF,0} \geq R_{RLF,high}$ and Thr$_0$→$R_{RLF,0} \geq R_{RLF,high}$. A determination is made whether $R_{RLF} \geq R_{RLF,high}$. Coverage holes resulting in insufficient signal strength from all RATs, and therefore, the answer is Yes.

A determination is made in S35 whether $R_{RLF,i+1}$ is not known or $R_{RLF,i+1} < R_{RLF,i}$. Since $R_{RLF,0}$ is known and $R_{RLF,0}=R_{RLF,-1}$, the answer is No. In S36, a determination is made whether $R_{RLF,i-1}$ is not known or $R_{RLF,i-1} \leq R_{RLF,i}$. Since $R_{RLF,-2}$ is known and $R_{RLF,-2} > R_{RLF,-1}$, the answer is No. Control returns to S33 to gather more statistics. There is still some margin before RAT1's signal strength/quality approaches radio link failure level at RAT coverage edge, i.e., $R_{RLF,-1}=R_{RLF,0}$. Statistics are gathered providing threshold→$R_{RLF}$ values of Thr$_{-2}$→$R_{RLF,-2} > R_{RLF,-1} \geq R_{RLF,high}$, Thr$_{-1}$→$R_{RLF,-1}=R_{RLF,0} \geq R_{RLF,high}$ and Thr$_0$→$R_{RLF,0} \geq R_{RLF,high}$. A determination is made whether $R_{RLF} \geq R_{RLF,high}$. Coverage holes resulting in insufficient signal strength from all RATs, and therefore, the answer is Yes.

A determination is made in S35 whether $R_{RLF,i+1}$ is not known or $R_{RLF,i+1} < R_{RLF,i}$. Since $R_{RLF,0}$ is known and $R_{RLF,0}=R_{RLF,-1}$, the answer is No. In S36, a determination is made whether $R_{RLF,i-1}$ is not known or $R_{RLF,i-1} \leq R_{RLF,i}$. Since $R_{RLF,-2}$ is known and $R_{RLF,-2} > R_{RLF,-1}$, the answer is No. Control returns to S33 to gather more statistics. There is still some margin before RAT1's signal strength/quality approaches radio link failure level at RAT coverage edge, i.e., $R_{RLF,-1}=R_{RLF,0}$. Statistics are gathered as above, and it may be assumed that the optimization process has converged.

Figure 17:
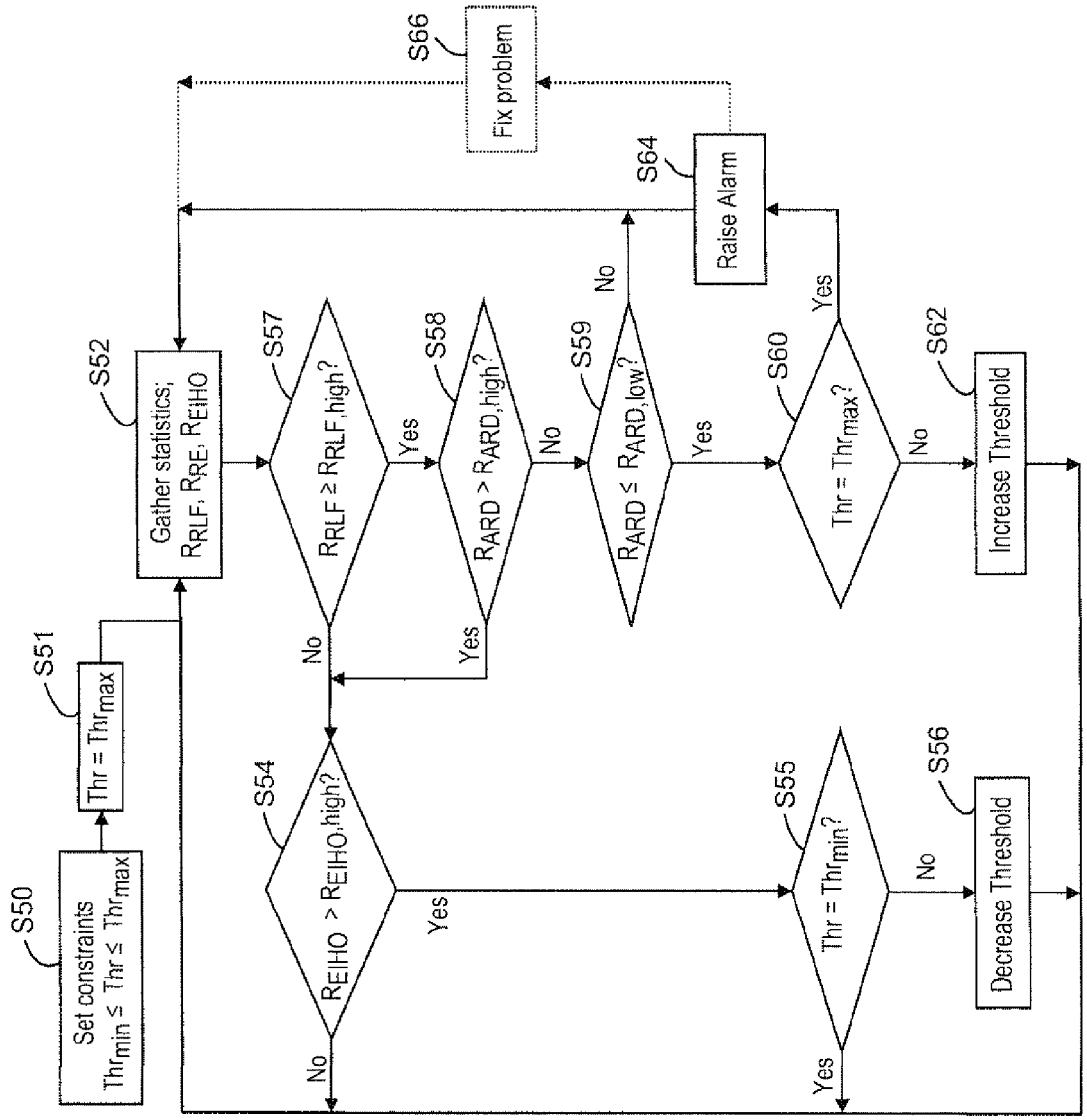
FIG. 17 is a flowchart diagram illustrating non-limiting, example procedures for adjusting a measurement triggering threshold in accordance with a second example 2.

Another example 2 illustrates an example embodiment using integrated evaluation of desired threshold change such as shown in the flowchart in FIG. 17. In this case, the integrated evaluation includes a combination of the following methods: method I1 evaluates whether a threshold increase is desired using Radio Link Failure Rate, method I3 evaluates whether a threshold increase is desired using All RAT Signal Drop Ratio, method D3 evaluates whether a threshold decrease is desired using All RAT Signal Drop Ratio; and method D4 evaluates whether a threshold decrease is desired using Early IRAT Handover Ratio.

Consider one of the cases described above, e.g. the RAT coverage edge cell, illustrated in FIG. 3. The IRAT measurement triggering threshold should be set so that IRAT HO is performed before the MS leaves the serving RAT's coverage. On the other hand, an IRAT HO should not be performed too long a time before the MS leaves serving RAT coverage, as this would result in inefficiency. For this case, example 2 results in the following steps as illustrated in the flowchart of FIG. 17.

Figure 18:
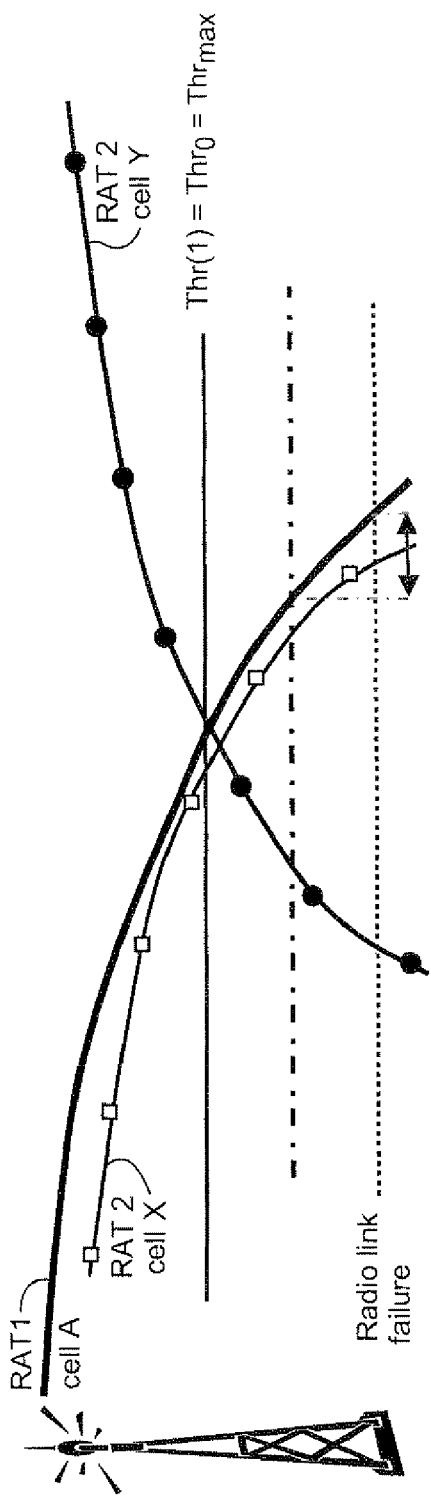
FIGS. 18-20 are illustrations showing a RAT1 and RAT2 signal strength/quality and threshold setting example 2 with different optimization loops 1-3.

Step S50 sets constraints on the IRAT measurement triggering threshold based on operator input and/or network statistics as Thr$_{min} \leq$ Thr $\leq$ Thr$_{max}$. Step 51 sets the IRAT measurement triggering threshold to an initial value Thr(1)=Thr$_0$=Thr$_{max}$ as shown in FIG. 18. Statistics are gathered in step S52.

Figure 19:
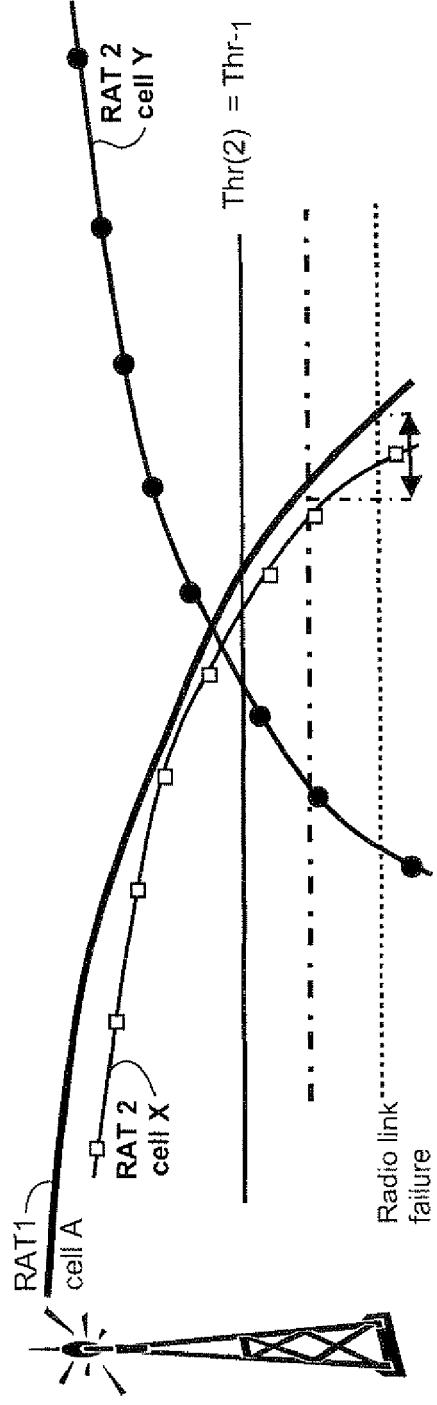

The high threshold gives a large margin to perform IRAT HO before RAT1's signal strength/quality approaches radio link failure level at RAT1's coverage edge, resulting in $R_{RLF} < R_{RLF,high}$. Due to the large margin, inefficiently early IRAT HOs occur resulting in $R_{EIHO} > R_{EIHO,high}$. No major coverage holes in the cell results in $R_{ARD} < R_{ARD,low} < R_{ARD,high}$. A determination is made in step S57 whether $R_{RLF} \geq R_{RLF,high}$. If the answer is Yes, a determination is made in step S58 whether $R_{ARD} > R_{ARD,high}$. If it is, control goes to step S54, described below. If not, a determination is made in step S59 whether $R_{ARD} \leq R_{ARD,low}$. If the answer is No, the threshold remains unchanged, and the second optimization loop (2) is started in step S52 with $Thr(2)=Thr_0$. In case $R_{ARD} \leq R_{ARD,low}$, a determination is made in step S60 whether $Thr=Thr_{max}$. If not, then the threshold is increased in step S62. If it is, then an alarm may be raised in step S64 so that the problem with a high radio link failure rate even for the maximum threshold setting can be fixed in step S66. But in this case, $R_{RLF} < R_{RLF,high}$, so the determination in step S57 gives No. Step S54 asks whether $R_{EIHO} > R_{EIHO,high}$, which it is in this case. It is decided in step S55 that Thr does not equal $Thr_{min}$, which means that the threshold is decreased in S56 to $Thr(2)=Thr_{-1}$ as shown in FIG. 19.

Figure 20:
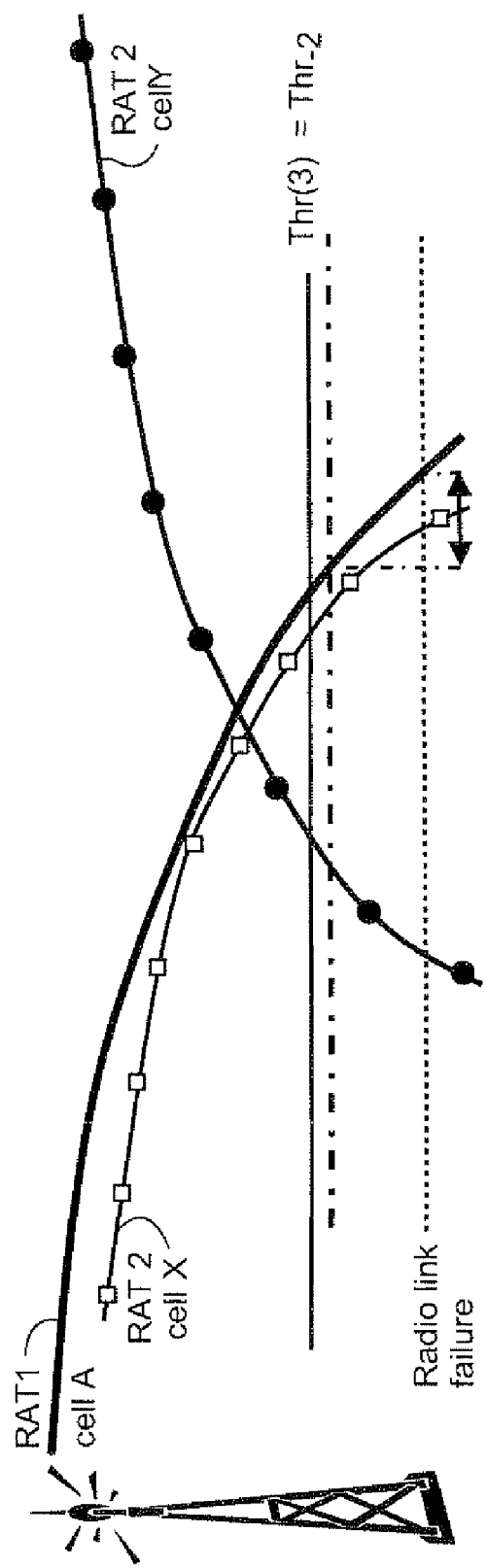

Control returns to S52 for the next optimization loop 2 to gather statistics. Because there is still a rather large margin to perform IRAT HO before RAT1 signal strength/quality approaches radio link failure level at RAT coverage edge, $R_{RLF} < R_{RLF,high}$. Inefficiently early handovers still occur, giving $R_{EIHO} > R_{EIHO,high}$. No major coverage holes in the cell results in $R_{ARD} < R_{ARD,low} < R_{ARD,high}$. A determination is made in step S57 whether $R_{RLF} \geq R_{RLF,high}$. In this case, $R_{RLF} < R_{RLF,high1}$ so the answer is No. Step S54 asks whether $R_{EIHO} > R_{EIHO,high}$, which it is in this case. It is decided in step S55 that Thr does not equal $Thr_{min}$, which means that the threshold is decreased in S56 to $Thr(3)=Thr_{-2}$ as shown in FIG. 20.

Control returns again to S52 for the next optimization loop 3 to gather statistics. There is still a sufficient margin to perform IRAT HO before RAT1 signal strength/quality approaches radio link failure level at RAT coverage edge, resulting in $R_{RLF} < R_{RLF,high}$. The margin is, however, no longer that large and only a few inefficiently early handovers occur, giving $R_{EIHO} < R_{EIHO,high}$. No major coverage holes in the cell results in $R_{ARD} < R_{ARD,low} < R_{ARD,high}$. A determination is made in step S57 whether $R_{RLF} \geq R_{RLF,high}$. In this case, $R_{RLF} < R_{RLF,high1}$ so the answer is No. Step S54 asks whether $R_{EIHO} > R_{EIHO,high}$. In this case, $R_{EIHO} < R_{EIHO,high}$, so the answer is No, and the threshold remains unchanged for the next optimization loop 4, $Thr(4)=Thr_{-2}$. Statistics are gathered as above, and it may be assumed that the optimization process has converged.

The technology provides many advantages. For example, with the automatic per BS IRAT HO measurement triggering threshold optimization, operator expenses for adjusting the IRAT measurement triggering threshold(s) to appropriate values manually are reduced, and the efficiency loss caused by non-optimized IRAT measurement triggering threshold(s) is minimized. The technology also adapts automatically to changes in network deployment. One situation in which the optimal values of IRAT HO measurement triggering threshold(s) may need to be changed over time is where cells start their life-cycle in hot-spots where they are on the coverage border and, as the deployment evolves, they end up being part of a fully covered area. Another situation is where changes in transmission power or antenna tilt can substantially change the coverage area of a cell. The technology also adapts to sudden changes in network performance. For instance, when a handover between two cells of the current RAT1 is not functioning correctly (e.g., because one of the cells is malfunctioning), the resulting bad performance is detected and automatically produces lower measurement triggering thresholds and therefore earlier IRAT measurements.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A computer-implemented method for use in determining whether to make measurements for a possible internetwork handover from a current radio access technology (RAT) network to a different type of RAT network may be appropriate for one or more mobile radios, comprising:
   a computer automatically obtaining information associated with a serving base station in the current RAT network serving a mobile radio and with one or more base stations in the different RAT network, the information including one or more parameters indicating an effect and efficiency of a current inter-RAT measurement triggering threshold;
   the computer automatically determining a new measurement triggering threshold value or adjusting an existing measurement triggering threshold value used by the current RAT network for initiating inter-RAT handover measurements by the mobile radio based on the obtained information; and
   communicating an indication of the new or adjusted measurement triggering threshold value so that the new or adjusted measurement triggering threshold value can be used by the mobile radio.

2. The method of claim 1, wherein the new or adjusted measurement triggering threshold is associated with the serving base station.

3. The method of claim 1, further comprising performing the obtaining step and the determining or adjusting step for multiple measurement triggering thresholds.

4. The method of claim 1, further comprising repeating the obtaining step and the determining or adjusting step in an optimization process until a desired measurement triggering threshold value is identified.

5. The method in claim 4, further comprising using the information obtained in one or more-earlier performed steps of obtaining the information along with currently-obtained information in the determining a new measurement triggering threshold value or adjusting an existing measurement triggering threshold value step.

6. The method of claim 4, wherein each repetition of the obtaining step and the determining or adjusting step in the optimization process results in a determination that the current inter-RAT measurement triggering threshold should be decreased, increased, or left unchanged.

7. The method of claim 1, further comprising prior to the obtaining step, setting one or more constraints on the new or adapted measurement triggering threshold value including a maximum measurement triggering threshold value and a minimum measurement triggering threshold value.

8. The method of claim 7, wherein the maximum measurement triggering threshold value is set at a level where the current RAT signal strength and/or quality meets a predetermined requirement and where there is time for a moving mobile radio to identify an inter-RAT candidate base station and perform an inter-RAT handover to the identified inter-RAT candidate base station, and wherein the minimum measurement triggering threshold value is set at a level such the inter-RAT measurement is triggered before a signal quality of the serving base station reaches a level that cause radio link failure.

9. The method of claim 7, further comprising prior to the obtaining step and after the setting of the one or more constraints, setting an initial measurement triggering threshold value.

10. The method of claim 1, wherein the one or more parameters includes a radio link failure (RLF) parameter associated with a number of radio link failures during a given time or an inverted mean time elapsed between radio link failures during a given time.

11. The method of claim 10, wherein the radio link failure (RLF) parameter is determined from a current RLF parameter and a previous RLF parameter determined for an earlier repetition of the obtaining step and the determining or adjusting step.

12. The method of claim 1, wherein the one or more parameters includes an inter-RAT handover measurement efficiency (IME) parameter that is based on a number of triggered inter-RAT measurements that actually result in a found inter-RAT handover candidate base station.

13. The method of claim 1, wherein the one or more parameters includes a RAT signal drop ratio which indicates how large a portion of radio link failures associated with the serving base station occurred when a signal quality drop also occurred in other RAT networks.

14. The method of claim 1, wherein the one or more parameters includes an early inter-RAT handover ratio which indicates how large a portion of mobile radios served by the serving base station before an inter-RAT handover for which an inter-RAT handover was triggered earlier than necessary.

15. The method in claim 1, wherein the parameters includes a radio link failure (RLF) parameter and one or more of an inter-RAT handover measurement efficiency parameter, a RAT signal drop ratio parameter, or an early inter-RAT handover ratio parameter.

16. Computer-implemented apparatus for use determining whether to make measurements for a possible internetwork handover from a current radio access technology (RAT) network to a different type of RAT network may be appropriate for one or more mobile radios, comprising:

a computer configured to obtain information associated with a serving base station in the current RAT network serving a mobile radio and with one or more base stations in the different RAT network, the information including one or more parameters indicating an effect and efficiency of a current inter-RAT measurement triggering threshold;

the computer configured to determining a new measurement triggering threshold value or adjusting an existing measurement triggering threshold value used by the current RAT network for initiating inter-RAT handover measurements by the mobile radio based on the obtained information; and communications circuitry configured to communicate an indication of the new or adjusted measurement triggering threshold value so that the new or adjusted measurement triggering threshold value can be used by the mobile radio.

17. The apparatus of claim 16, wherein the new or adjusted measurement triggering threshold is associated with the serving base station.

18. The apparatus of claim 16, wherein the computer is configured to obtain the information and determine the new measurement triggering threshold value or adjust the existing triggering threshold measurement value for multiple measurement triggering thresholds.

19. The apparatus of claim 16, wherein the computer is configured to repeat obtaining the information and determining the new measurement triggering threshold value or adjusting the existing triggering threshold measurement value in an optimization process until a desired measurement triggering threshold value is identified.

20. The apparatus of claim 19, wherein the computer is configured to use earlier-obtained information along with currently-obtained information to determine a new measurement triggering threshold value or adjust an existing measurement triggering threshold value.

21. The apparatus of claim 19, wherein each repetition results in a determination that the current inter-RAT measurement triggering threshold should be decreased, increased, or left unchanged.

22. The apparatus of claim 16, wherein prior to the obtaining, the computer is configured to set one or more constraints on the new or adapted measurement triggering threshold value including a maximum measurement triggering threshold value and a minimum measurement triggering threshold value.

23. The apparatus of claim 22, wherein the maximum measurement triggering threshold value is set at a level where the current RAT signal strength and/or quality meets a predetermined requirement and where there is time for a moving mobile radio to identify an inter-RAT candidate base station and perform an inter-RAT handover to the identified inter-RAT candidate base station, and wherein the minimum measurement triggering threshold value is set at a level such the inter-RAT measurement is triggered before a signal quality of the serving base station reaches a level that cause radio link failure.

24. The apparatus of claim 22, wherein prior to the obtaining and after the setting of the one or more constraints, the computer is configured to set an initial measurement triggering threshold value.

25. The apparatus of claim 16, wherein the one or more parameters includes a radio link failure (RLF) parameter associated with a number of radio link failures during a given time or an inverted mean time elapsed between radio link failures during a given time.

26. The apparatus of claim 25, wherein the radio link failure (RLF) parameter is based on a current RLF parameter and a previous RLF parameter determined for an earlier repetition.

27. The apparatus of claim 25, wherein the one or more other parameters includes an inter-RAT handover measurement efficiency parameter, a RAT signal drop ratio parameter, or an early inter-RAT handover ratio parameter.

28. The apparatus of claim 16, wherein the one or more parameters includes an inter-RAT handover measurement efficiency (IME) parameter that is based on a number of triggered inter-RAT measurements that actually result in a found inter-RAT handover candidate base station.

29. The apparatus of claim 16, wherein the one or more parameters includes a RAT signal drop ratio which indicates how large a portion of radio link failures associated with the serving base station occurred when a signal quality drop also occurred in other RAT networks.

30. The apparatus of claim 16, wherein the one or more parameters includes an early inter-RAT handover ratio which indicates how large a portion of mobile radios served by the serving base station before an inter-RAT handover for which an inter-RAT handover was triggered earlier than necessary.

31. The apparatus of claim 16, wherein the apparatus is implemented in the serving base station.

32. The apparatus of claim 16, wherein the apparatus is implemented in a node that communicates with the serving base station.

* * * * *

UNITED STATES PATENT AND TRADEMARK OFFICE
CERTIFICATE OF CORRECTION

PATENT NO. : 8,238,920 B2
APPLICATION NO. : 12/690625
DATED : August 7, 2012
INVENTOR(S) : Zetterberg et al.

It is certified that error appears in the above-identified patent and that said Letters Patent is hereby corrected as shown below:

In Column 8, Line 64, delete "ME=$R_{RT}$." and insert -- IME=$R_{RT}$. --, therefor.

In Column 9, Line 20, delete "(MO)." and insert -- (IHO). --, therefor.

In Column 9, Line 56, delete "$R_{AM}$," and insert -- $R_{ARD}$, --, therefor.

In Column 10, Line 40, delete "Thr(k+1) = Thr(k)+$\delta_D$" and insert -- Thr(k+1) = Thr(k) − $\delta_D$ --, therefor.

In Column 12, Line 13, delete "$R_{ARD}$>$R_{ARD,high}$, $R_{ARD, high}$" and insert -- $R_{ARD}$>$R_{ARD,high}$, where $R_{ARD, high}$ --, therefor.

In Column 13, Line 38, delete "$R_{RLF, j+1}$" and insert -- $R_{RLF, i+1}$ --, therefor.

In Column 14, Line 25, delete "$R_{RLF,i-1}R \leq R_{RLF,i}$." and insert -- $R_{RLF,i-1} \leq R_{RLF,i}$. --, therefor.

Signed and Sealed this
Fifth Day of February, 2013

Teresa Stanek Rea
*Acting Director of the United States Patent and Trademark Office*